US010691927B2

(12) United States Patent
Qian et al.

(10) Patent No.: US 10,691,927 B2
(45) Date of Patent: Jun. 23, 2020

(54) IMAGE DEFORMATION PROCESSING METHOD AND APPARATUS, AND COMPUTER STORAGE MEDIUM

(71) Applicant: TENCENT TECHNOLOGY (SHENZHEN) COMPANY LIMITED, Shenzhen, Guangdong (CN)

(72) Inventors: Meng Ren Qian, Shenzhen (CN); Zhi Bin Wang, Shenzhen (CN); Pei Cheng, Shenzhen (CN); Xuan Qiu, Shenzhen (CN); Xiao Yi Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

(21) Appl. No.: 16/014,410

(22) Filed: Jun. 21, 2018

(65) Prior Publication Data
US 2018/0300537 A1 Oct. 18, 2018

Related U.S. Application Data

(63) Continuation of application No. PCT/CN2017/080822, filed on Apr. 17, 2017.

(30) Foreign Application Priority Data

Apr. 27, 2016 (CN) .......................... 2016 1 0270547

(51) Int. Cl.
*H04N 7/00* (2011.01)
*G06K 9/00* (2006.01)
(Continued)

(52) U.S. Cl.
CPC ..... *G06K 9/00281* (2013.01); *G06K 9/00248* (2013.01); *G06K 9/6206* (2013.01);
(Continued)

(58) Field of Classification Search
USPC .......................................... 382/118
See application file for complete search history.

(56) References Cited

FOREIGN PATENT DOCUMENTS

| CN | 101000688 A | 7/2007 |
|----|-------------|--------|
| CN | 102971769 A | 3/2013 |

(Continued)

OTHER PUBLICATIONS

Chen Yi Li, "Data Driven Enhancement of facial attractiveness", 2012, 8 pages total.

(Continued)

*Primary Examiner* — Stephen P Coleman
(74) *Attorney, Agent, or Firm* — Sughrue Mion, PLLC

(57) ABSTRACT

A method and system are provided. The method includes positioning facial feature base points in a face image in an obtained image. A deformation template is obtained, the deformation template carrying configuration reference points and configuration base points. In the facial feature base points, a current reference point is determined corresponding to the configuration reference point, and a to-be-matched base point is determined corresponding to the configuration base point. A target base point is determined that corresponds to the configuration base point and that is in a to-be-processed image. The target base point and the corresponding to-be-matched base point forming form a mapping point pair. A to-be-processed image point is mapped to a corresponding target location according to a location relationship between the target base point and the to-be-matched base point, and a location relationship between the mapping point pair and the to-be-processed image point.

20 Claims, 18 Drawing Sheets

(51) Int. Cl.
*G06K 9/62* (2006.01)
*G06T 7/33* (2017.01)
*G06T 17/20* (2006.01)

(52) U.S. Cl.
CPC .............. *G06T 7/33* (2017.01); *G06T 17/205* (2013.01); *G06T 2207/30201* (2013.01)

(56) References Cited

FOREIGN PATENT DOCUMENTS

| | | | |
|---|---|---|---|
| CN | 103916588 | A | 7/2014 |
| CN | 104751404 | A | 7/2015 |
| CN | 105118024 | A | 12/2015 |
| CN | 105184249 | A | 12/2015 |
| CN | 105184735 | A | 12/2015 |
| CN | 105205779 | A | 12/2015 |
| CN | 105956997 | A | 9/2016 |
| JP | 2007-034724 | A | 2/2007 |
| JP | 2011-53942 | A | 3/2011 |
| JP | 2011-233073 | A | 11/2011 |
| JP | 2013-171470 | A | 9/2013 |
| KR | 1020090041039 | A | 4/2009 |
| KR | 1020140086463 | A | 7/2014 |
| WO | 2011152842 | A1 | 12/2011 |

OTHER PUBLICATIONS

Guo Hai Jing, "Remote Sensing Image Registration based on Delaunay Triangulation", China Academic Journal Electronic Publishing House, pp. 117-121, 2014, 5 pages total.

Written Opinion dated Jul. 6, 2017 issued by the International Searching Authority in PCT/CN2017/080822.

Communication dated Feb. 19, 2019 from the State Intellectual Property Office of the P.R.C. in counterpart application No. 201610270547.2.

Communication dated Nov. 1, 2018 from the State Intellectual Property Office of the P.R.C. in counterpart application No. 201610270547.2.

International Search Report for PCT/CN2017/080822 dated Jul. 6, 2017 [PCT/ISA/210].

Communication dated May 21, 2019, issued by the Japan Patent Office in corresponding Japanese Application No. 2018-517437.

Notification of Reason for Refusal dated Jul. 8, 2019 from the Korean Intellectual Property Office in application No. 10-2018-7009599.

International Search Report and Translation of Written Opinion, dated Jul. 6, 2017 from the International Bureau in counterpart International application No. PCT/CN2017/080822.

IMAGE DEFORMATION PROCESSING METHOD AND APPARATUS, AND COMPUTER STORAGE MEDIUM

CROSS-REFERENCE TO RELATED APPLICATION

This application is a continuation of International Application No. PCT/CN2017/080822, filed on Apr. 17, 2017, which claims priority from Chinese Patent Application No. 201610270547.2, entitled "an image deformation processing method and apparatus, and a computer storage medium" filed on Apr. 27, 2016, in the Chinese Patent Office, the disclosures of which are incorporated by reference herein in their entireties.

BACKGROUND

1. Field

With the development of image processing technologies and computer technologies, users have increase higher demands for beautifying and deforming captured portrait images. Facial feature deformation is an application in the field of image deformation, and is widely applied to advertisements, movies, animations, and other fields.

An existing face deformation technology is generally based on a deformation algorithm for a local image, and deformation is performed by using a model parameter. However, it fails to present an image that adaptively matches a target shape provided by a user.

SUMMARY

It may be an aspect to provide an image deformation processing method and apparatus, and a computer storage medium to improve a matching degree between a deformed image and a target image.

According to an aspect of one or more example embodiments, there is provided method for an image deformation processing apparatus. The method includes positioning facial feature base points in a face image in an obtained image. A deformation template is obtained, the deformation template carrying configuration reference points and configuration base points. In the facial feature base points, a current reference point is determined corresponding to the configuration reference point, and a to-be-matched base point is determined corresponding to the configuration base point. A target base point is determined that corresponds to the configuration base point and that is in a to-be-processed image. The target base point and the corresponding to-be-matched base point forming form a mapping point pair. A to-be-processed image point is mapped to a corresponding target location according to a location relationship between the target base point and the to-be-matched base point, and a location relationship between the mapping point pair and the to-be-processed image point.

According to an aspect of one or more example embodiments, there is provided an apparatus for an image deformation processing method. The apparatus includes a base point positioning module, a base point differentiation module, a similarity mapping module, and a to-be-processed image point mapping module. The base point positioning module is configured to position facial feature base points in a face image in an obtained image. The base point differentiation module is configured to obtain a deformation template, the deformation template carrying configuration reference points and configuration base points; and determine, in the facial feature base points, a current reference point corresponding to the configuration reference point, and a to-be-matched base point corresponding to the configuration base point. The similarity mapping module is configured to determine a target base point that corresponds to the configuration base point and that is in a to-be-processed image, the target base point and the corresponding to-be-matched base point forming a mapping point pair. The to-be-processed image point mapping module is configured to map a to-be-processed image point to a corresponding target location according to a location relationship between the target base point and the to-be-matched base point, and a location relationship between the mapping point pair and the to-be-processed image point.

According to an aspect of one or more example embodiments, there is provided a non-transitory computer-readable storage medium storing a program for an image deformation processing method. The program includes obtain to-be-processed image, identify a face image in the to-be-processed image, and position facial feature base points in the face and obtain a deformation template. The deformation template carrying configuration reference points and configuration base points; and a current reference point corresponding to the configuration reference point. A to-be-matched base point is determined corresponding to the configuration base point in the facial feature base points. A facial feature similarity mapping is performed based on a location relationship between the configuration reference point and the configuration base point, and a location relationship between the current reference point and the to-be-matched base point; a target base point that corresponds to the configuration base point and that is in the to-be-processed image is obtained. The target base point and the corresponding to-be-matched base point forming a mapping point pair; and a mapping relationship of a to-be-processed image point is determined based on a location relationship between the target base point and the to-be-matched base point in the mapping point pair, and a location relationship between the mapping point pair and the to-be-processed image point. The to-be-processed image point is mapped to a corresponding target location according to the mapping relationship. The deformation template carries the configuration reference points and the configuration base points. The facial feature similarity mapping is first performed by using the corresponding current reference point and the to-be-matched base point in the to-be-processed image, to obtain the target base point. The mapping relationship of the to-be-processed image point is determined, to map the to-be-processed image point to the corresponding target location, so that a magnitude of deformation can be adaptively determined according to the deformation template, thereby improving a matching degree between a deformed image and a target image.

BRIEF DESCRIPTION OF THE DRAWINGS

The accompanying drawings described herein are used to provide further understanding for this application, and constitute a part of this application. Exemplary embodiments of this application and descriptions are used to explain this application and do not constitute any inappropriate limit on this application.

DETAILED DESCRIPTION OF THE EXAMPLE EMBODIMENTS

Figure 1:
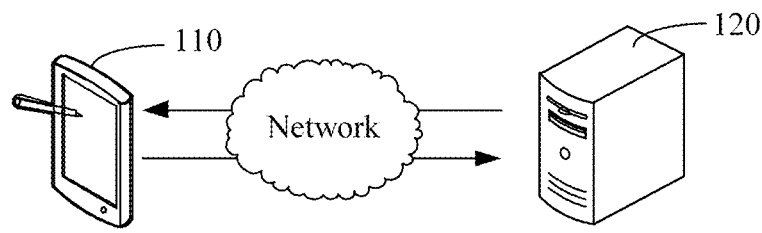
FIG. 1 is a diagram of an application environment of an image deformation processing method according to an example embodiment.

FIG. 1 is a diagram of an application environment in which an image deformation processing method is run according to an example embodiment. As shown in FIG. 1, the application environment may include a terminal 110 and a server 120. The terminal 110 may communicate with the server 120 by using a network.

The terminal 110 may be a smartphone, a tablet computer, a notebook computer, a desktop computer, or the like, but is not limited thereto. The terminal 110 may send a deformation template obtaining request, image data, and the like to the server 120; and the server 120 may send a deformation template and the like to the terminal 110. The image deformation processing method may be implemented on the terminal or the server.

Figure 2:
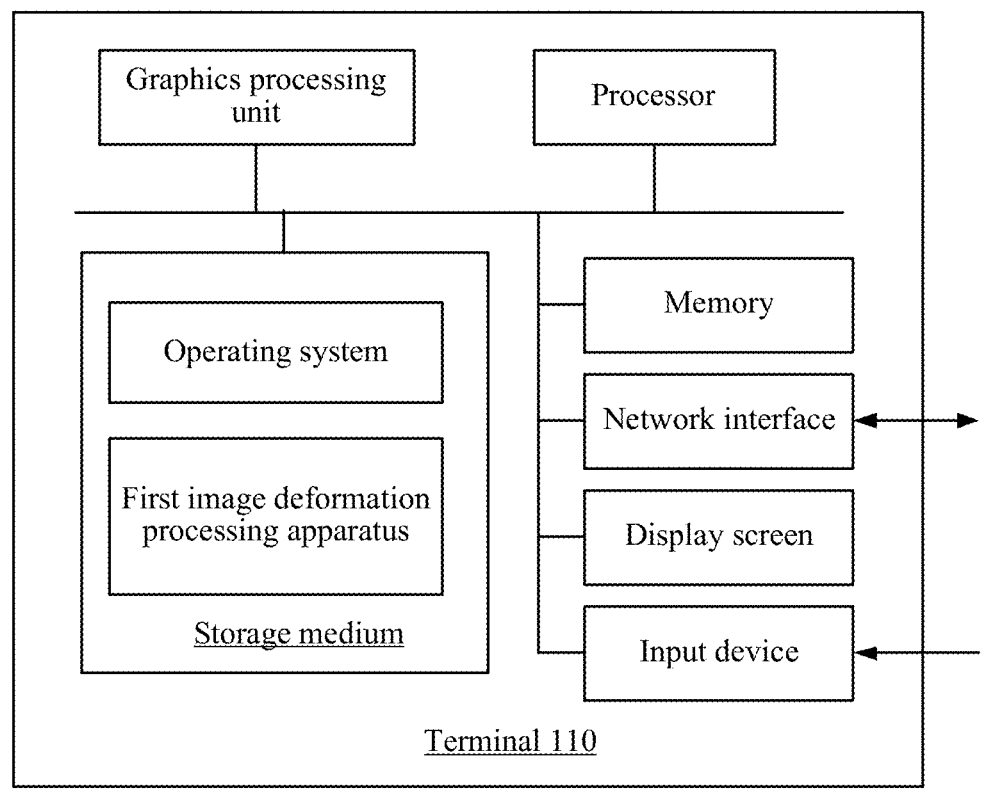
FIG. 2 is a diagram of an internal structure of a terminal in FIG. 1 according to an example embodiment.

In example embodiments, an internal structure of the terminal 110 in FIG. 1 is shown in FIG. 2. The terminal 110 includes a processor, a graphics processing unit (GPU), a storage medium, a memory, a network interface, a display screen, and an input device that are connected to each other by using a system bus. The storage medium of the terminal 110 stores an operating system, and further includes a first image deformation processing apparatus, configured to implement an image deformation processing method applicable to the terminal. The processor is configured to provide computing and control capabilities, to support running of the entire terminal 110. In the terminal 110, the GPU is configured to provide at least a display interface drawing capability; and the memory provides an environment for running of the first image deformation processing apparatus in the storage medium. The memory may store computer-readable instructions, and when being executed by the processor, the computer-readable instructions may cause the processor to perform the image deformation processing method. The network interface is configured to communicate with the server 120 by using a network, for example, send the deformation template obtaining request to the server 120, and receive data returned by the server 120. The display screen is configured to display an application interface and the like. The input device is configured to receive a command, data, or the like entered by a user. For the terminal 110 having a touchscreen, the display screen and the input device may be the touchscreen.

Figure 3:
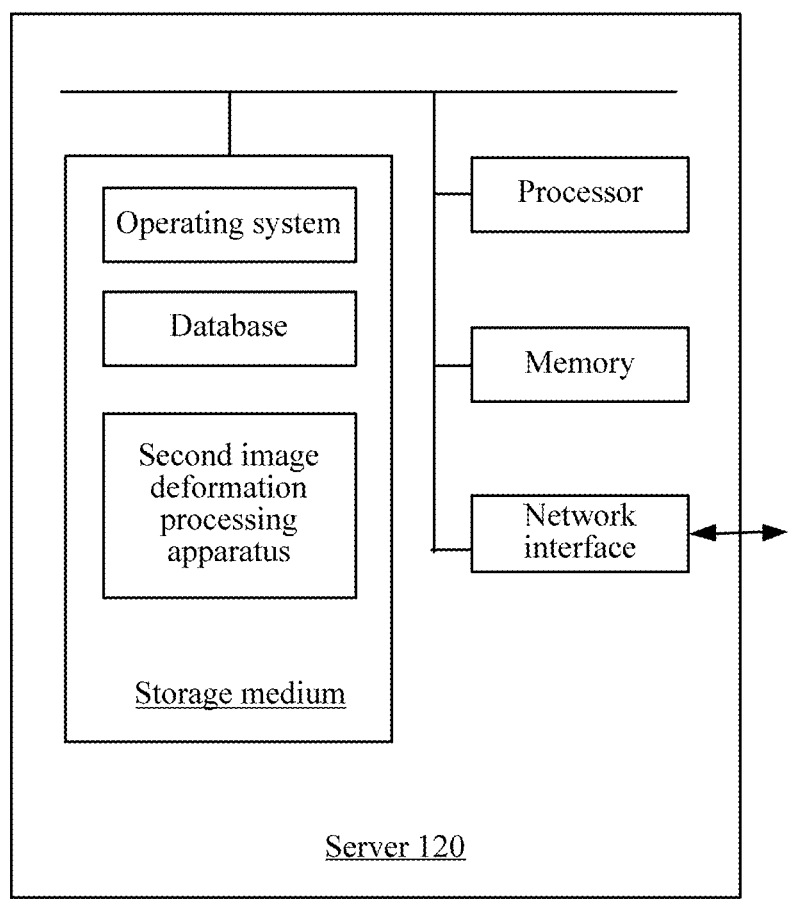
FIG. 3 is a diagram of an internal structure of a server in FIG. 1 according to an example embodiment.

In an example embodiment, an internal structure of the server 120 in FIG. 1 is shown in FIG. 3, and the server 120 includes a processor, a storage medium, a memory, and a network interface that are connected to each other by using a system bus. The storage medium of the server 120 stores an operating system, a database, and a second image deformation processing apparatus. The second image deformation processing apparatus is configured to implement an image deformation processing method applicable to the server 120. The processor of the server 120 is configured to provide computing and control capabilities, to support running of the entire server 120. The memory in the server 120 provides an environment for running of the second image deformation processing apparatus in the storage medium. The memory may store computer-readable instructions, and when being executed by the processor, the computer-readable instructions may cause the processor to perform the image deformation processing method. The network interface of the server 120 is configured to connect to and communicate with the external terminal 110 by using a network, for example, receive image data sent by the terminal 110, and return data to the terminal 110.

Figure 4:
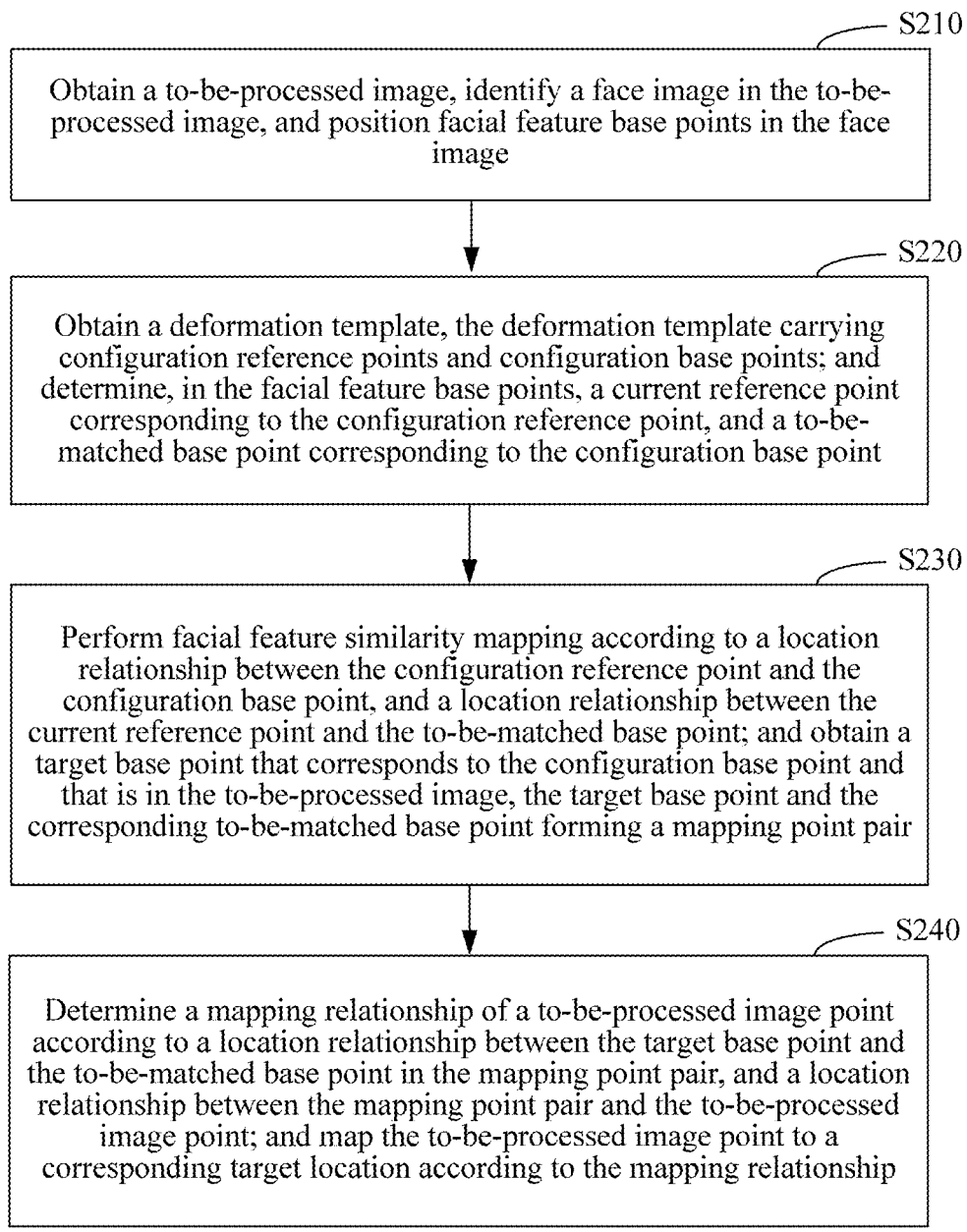
FIG. 4 is a flowchart of an image deformation processing method according to an example embodiment.

As shown in FIG. 4, in an example embodiment, an image deformation processing method is provided, which is exemplified by a terminal or a server applied in the foregoing application environment. The method includes the following steps:

In Step S210, obtain a to-be-processed image, identify a face image in the to-be-processed image, and position facial feature base points in the face image.

Figure 5:
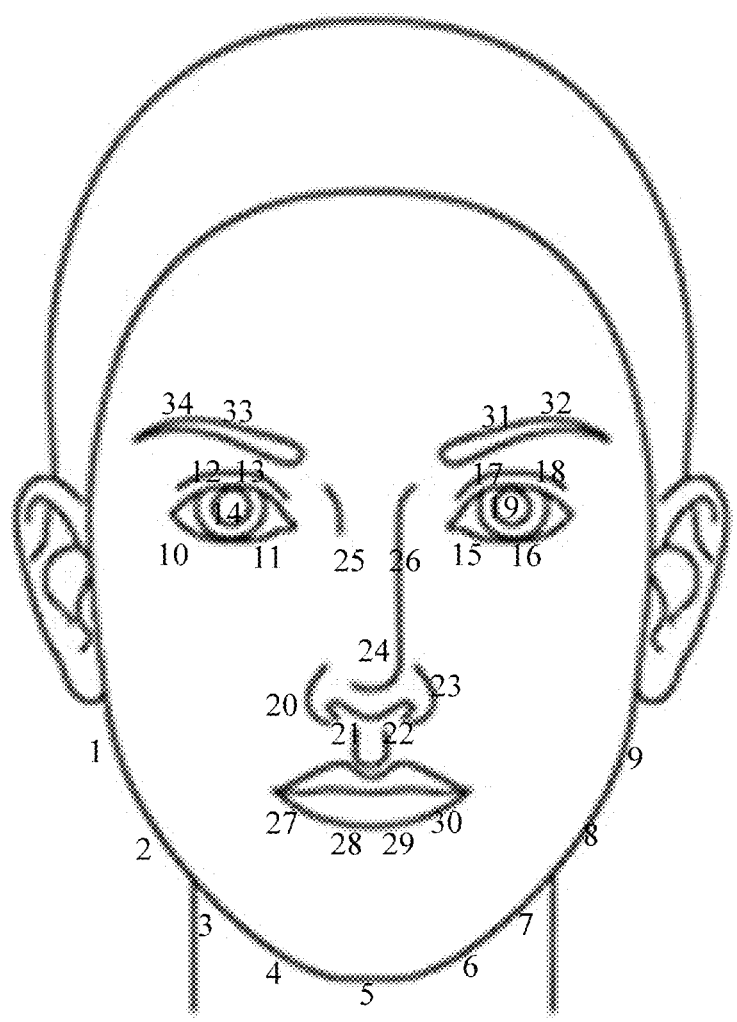
FIG. 5 is a schematic diagram of facial feature base points in a face image according to an example embodiment.

The to-be-processed image may be an image captured by a camera in real time, or may be an image pre-stored by a terminal, or may be an image obtained from a server in real time. The face image in the to-be-processed image may be identified by using a face detection algorithm. The face detection algorithm may be customized by the user as needed, for example, the detection algorithm may include, but is not limited to, an OpenCV face detection algorithm, a face detection algorithm provided by the IOS or the Android system, or a Face++ face detection algorithm. For any to-be-processed image, the face detection algorithm may extract and determine whether the image includes a face and/or a specific area of the face. For example, a location of the face is identified by using a rectangular box, and if there are multiple faces, multiple rectangular boxes are returned. The facial feature base points are key points for determining a facial feature, and an expression and action in the face. FIG. 5 is a schematic diagram of facial feature base points in a face image. The facial feature base points include: face contour base points, that is, points numbered from 1 to 9 in the figure; left and right eye base points, that is, points numbered from 10 to 14, and points numbered from 15 to 19 in the figure; nose base points, that is, points numbered from 20 to 26 in the figure; lip base points, that is, points numbered from 27 to 30 in the figure; left and right eyebrow base points, that is, points numbered 31 and 32, and points numbered 33 and 34 in the figure; and the like. Different parts correspond to different types of base points, and the facial feature base points include at least one type of base points.

In Step S220, obtain a deformation template. The deformation template carrying configuration reference points and configuration base points. A current reference point corresponding to the configuration reference point is determined in the facial feature base points; and a to-be-matched base point corresponding to the configuration base point.

The deformation template is an image of a target shape that carries target features such as a pointed face, big eyes, or a small nose, and the like. The deformation template may be obtained by off-line preprocessing or on-line preprocessing of any target image. The preprocessing process includes extracting the facial feature base points, and obtaining the specific locations of the facial feature base points in the target image. The locations may be recorded by using coordinates and identified by using icons. On the other hand, when the detection algorithm cannot directly obtain the facial feature based points from the deformation template, the facial feature base points may be marked or labeled by off-line manual annotation. The configuration reference point and the configuration base point are both facial feature base points. The configuration reference point is used to determine a location difference between facial feature base points in the current to-be-processed image and the deformation template. The configuration base point is used to calculate deformation trends of facial feature base points in the current to-be-processed image and the deformation template, and is a control point affecting deformation of another to-be-processed image point. For different facial feature deformation, different configuration reference points may be set, for example, face shape reference points: a nose tip, outer contour points corresponding to left and right eyes, and a chin tip point; left eye deformation reference points: a central point of the left eye, the nose tip, and a facial contour point corresponding to the left eye; right eye deformation reference points: a central point of the right eye, the nose tip, and a facial contour point corresponding to the right eye; nose deformation reference points: the central point of the left eye, the nose tip, and the central point of the right eye; and mouth deformation reference points, where determined reference points are classified into left parts and right parts based on locations of different points on a mouth, which are a central point of the mouth, the nose tip, and the central point of the left eye; and the central point of the mouth, the nose tip, and the central point of the right eye respectively.

Figure 6:
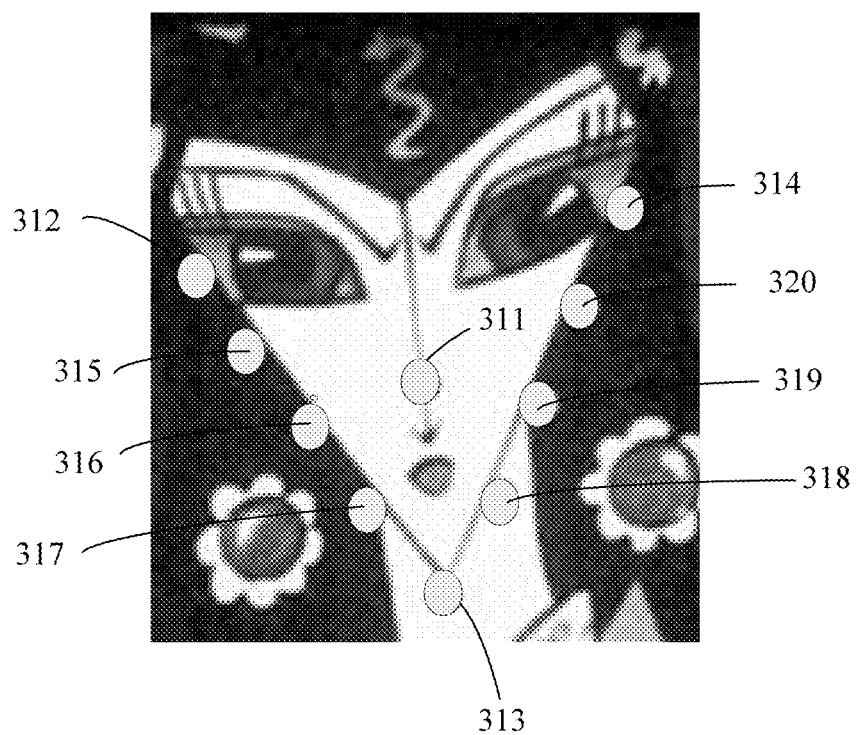
FIG. 6 is a schematic diagram of facial feature base points in a deformation template according to an example embodiment.
Figure 7:
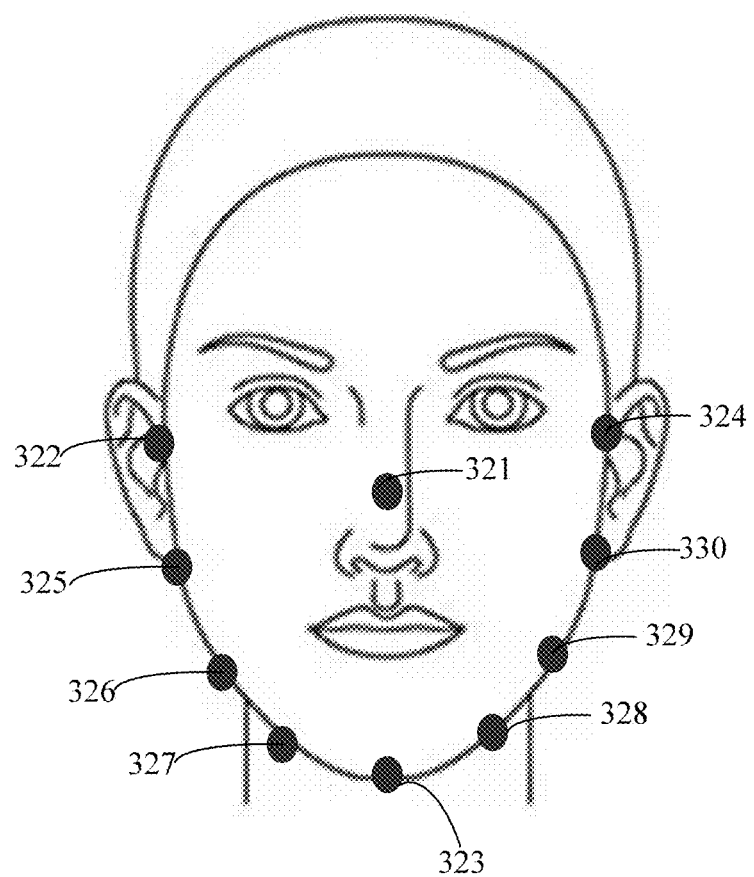
FIG. 7 is a schematic diagram of facial feature base points in a to-be-processed image according to an example embodiment.

The facial feature base points detected in the to-be-processed image may be controlled to correspond to the configuration reference points and the configuration base point in the deformation template. Facial feature base point detection may be performed on the to-be-processed image and the deformation template by using a same algorithm, to ensure matching between the facial feature base points detected in the to-be-processed image and the deformation template. However, if the facial feature base points detected in the to-be-processed image do not correspond to the configuration reference points and the configuration base points in the deformation template, for example, quantities thereof are not the same, secondary detection may be performed, or mismatching base points are removed from a matching algorithm. If the configuration reference points in the deformation template are four points, that is, the nose tip, the outer contour points corresponding to the left and right eyes, and the chin tip, a corresponding point at the nose tip, corresponding outer contour points corresponding to the left and right eyes, and a corresponding point at the chin tip are obtained from the facial feature base points in the to-be-processed image, as current reference points. During image deformation, locations of the current reference points remain unchanged, and are used as reference for positioning. FIG. 6 is a schematic diagram of a deformation template, where 311, 312, 313, 314 are configuration reference points, and 315 to 320 are configuration base points. FIG. 7 is a schematic diagram of a to-be-processed image, where 321, 322, 323, 324 are current reference points, and 325 to 330 are to-be-matched base points. A quantity of the current reference points is the same as and corresponds to a quantity of the configuration reference points, and a quantity of the to-be-matched base points is the same as and corresponds to a quantity of the configuration base points.

In Step S230, perform facial feature similarity mapping based on a location relationship between the configuration reference point and the configuration base point, and a location relationship between the current reference point and the to-be-matched base point; and obtain a target base point that corresponds to the configuration base point and that is in the to-be-processed image, the target base point and the corresponding to-be-matched base point forming a mapping point pair.

In Step S230, the configuration reference points may be combined to form a corresponding pattern. For example, any adjacent three points form a configuration triangle, or four points form a quadrangle. The current reference points may also be combined by using a same rule for the configuration reference points, to form a corresponding current triangle, a corresponding current quadrangle, or the like. The configuration base point may be mapped to a corresponding location in the to-be-processed image by using an area ratio between a configuration pattern and a current pattern, an angle ratio between corresponding patterns in the configuration pattern and the current pattern, a distance ratio between the configuration base point and the configuration reference point, and a location relationship between line segments formed between the configuration base points and the configuration reference points, to obtain the target base point. During mapping, a deformation factor may be calculated first, and then, a location of the target base point is calculated according to the deformation factor. An algorithm for performing similarity mapping may be user-defined as required. In an example embodiment, a connection line between adjacent current reference points is obtained, to obtain a reference line segment; a connection line between adjacent current reference points is obtained, to obtain a current line segment; a reference line segment adjacent to the configuration base point is obtained; and a location relationship between the target base point and the current line segment is determined based on a location relationship between the configuration base point and the reference line segment, to determine the location of the target base point based on the location relationship. If the configuration base point is exactly on the reference line segment, it is obtained that the location of the target base point is on the corresponding current line segment. The target base point corresponds to the to-be-matched base point, and a displacement offset between the target base point and the to-be-matched base point indicates a magnitude of deformation between the deformation template and the to-be-processed image.

In Step S240, determine a mapping relationship of a to-be-processed image point based on a location relationship between the target base point and the to-be-matched base point in the mapping point pair, and a location relationship between the mapping point pair and the to-be-processed image point; and map the to-be-processed image point to a corresponding target location based on the mapping relationship.

When there is displacement offset between the target base point and the to-be-matched base point in the mapping point pair, the corresponding displacement offset may be obtained by calculating the coordinates of the target base point and the to-be-matched base point. If the coordinates of the target base point is (x, y), and the coordinates of the to-be-matched base point is (a, b), a displacement difference is (x-a, y-b). The displacement offset may be indicated in a form of a vector. The to-be-processed image may be divided into areas according to distribution locations of mapping point pairs. Different areas include corresponding mapping point pairs, for example, a first area includes a first mapping point pair, and a to-be-processed image point in the first area is affected only by the first mapping point pair, and another mapping point pair does not affect deformation of the to-be-processed image point in the first area. The to-be-processed image may be not divided into areas, and a deformation influencing weight of each mapping point pair for a to-be-processed image point is calculated according to a distance between the mapping point pair and the to-be-processed image point. A mapping relationship of a to-be-processed image point is calculated by combining the influencing weight and the displacement offset, and a location of the to-be-processed image point after deformation may be directly determined by using the mapping relationship, to map the to-be-processed image point to the corresponding target location.

In this example embodiment, a to-be-processed image is obtained, a face image in the to-be-processed image is identified, and facial feature base points in the face image are positioned; a deformation template is obtained, the deformation template carrying configuration reference points and configuration base points; and a current reference point corresponding to the configuration reference point, and a to-be-matched base point corresponding to the configuration base point are determined in the facial feature base points; facial feature similarity mapping is performed based on a location relationship between the configuration reference point and the configuration base point, and a location relationship between the current reference point and the to-be-matched base point; a target base point that corresponds to the configuration base point and that is in the to-be-processed image is obtained, the target base point and the corresponding to-be-matched base point forming a mapping point pair; and a mapping relationship of a to-be-processed image point is determined based on a location relationship between the target base point and the to-be-matched base point in the mapping point pair, and a location relationship between the mapping point pair and the to-be-processed image point; and the to-be-processed image point is mapped to a corresponding target location according to the mapping relationship. The deformation template carries the configuration reference points and the configuration base points. The facial feature similarity mapping is first performed by using the corresponding current reference point and the to-be-matched base point in the to-be-processed image, to obtain the target base point, and then, the mapping relationship of the to-be-processed image point is determined, to map the to-be-processed image point to the corresponding target location, so that a magnitude of deformation may be adaptively determined based on the deformation template, thereby improving a matching degree between a deformed image and a target image.

In an example embodiment, the deformation template includes configuration base points and configuration reference points that correspond to multiple types of facial features.

The different facial feature types for deformation lead to different locations and quantities of corresponding configuration base points and configuration reference points. For example, for face shape deformation, configuration reference points are the nose tip, the outer contour points corresponding to the left and right eyes, and the chin tip point; and configuration base points are points on an outer contour of the face. For left eye deformation, configuration reference points are the central point of the right eye, the nose tip, and facial contour points corresponding to the right eye; and configuration base points are points on an outer contour of the eye. The configuration base points are generally points on an outer contour of a deformed facial feature, and points that are near the deformed facial feature and that facilitate positioning may be selected as the configuration reference points as required. Configuration base points and configuration reference points that correspond to multiple types of facial features are included, multiple types of facial feature deformation may be completed at once, and magnitudes of deformation of the various types of facial feature deformation affect each other, thereby implementing facial feature deformation globally.

Figure 8:
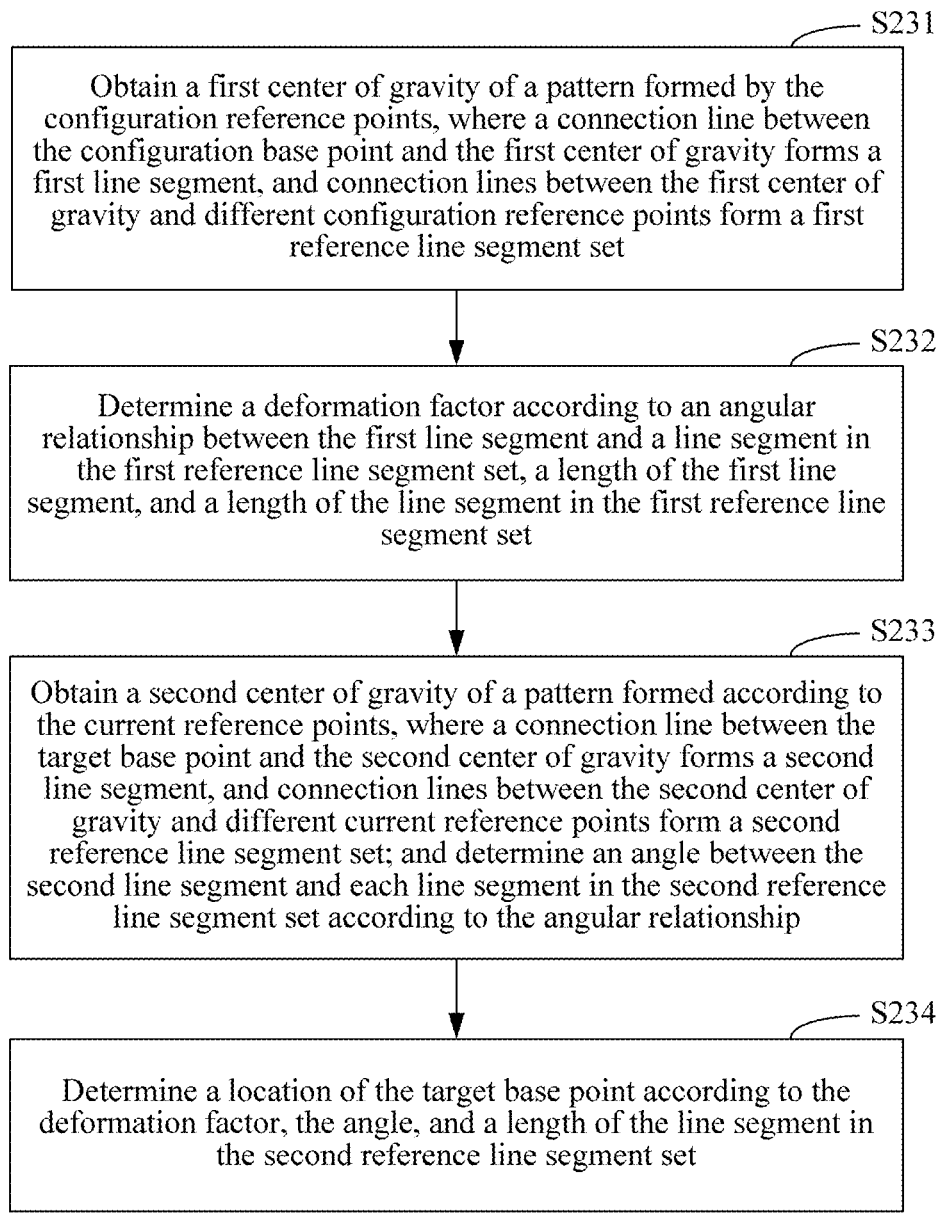
FIG. 8 is a flowchart of determining a location of a target base point according to an example embodiment.

In an example embodiment, as shown in FIG. 8, step S230 may include the following steps:

In Step S231, obtain a first center of gravity of a pattern formed by the configuration reference points, where a connection line between the configuration base point and the first center of gravity forms a first line segment, and connection lines between the first center of gravity and different configuration reference points form a first reference line segment set.

Figure 9:
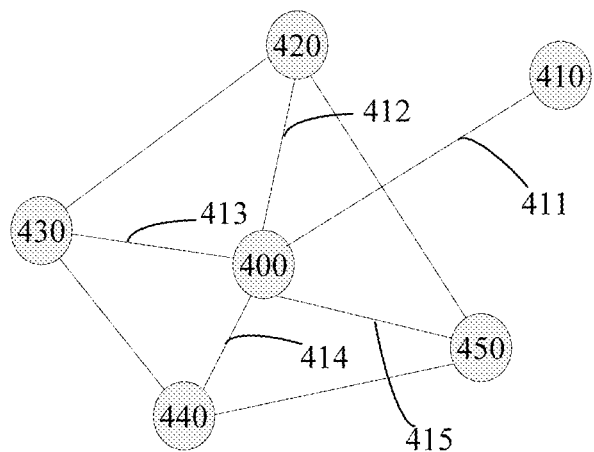
FIG. 9 is a schematic diagram of a location relationship between a configuration reference point and a configuration base point according to an example embodiment.

A quantity of obtained configuration reference points may be user-defined as required, and is at least three. For example, a first center of gravity 400 of a quadrangle formed by any four adjacent configuration reference points is obtained. Generally, there are multiple configuration base points, and a location of a target base point corresponding to each configuration base point is determined successively. As shown in FIG. 9, a connection line between a configuration base point 410 and the first center of gravity 400 forms a first line segment 411, and connection lines between the first center of gravity 400 and different configuration reference points 420, 430, 440, and 450 form a first reference line segment set may include first reference line segments 412, 413, 414, and 415.

In Step S232, a deformation factor is determined based on an angular relationship between a length of the first line segment set and a length of a line segment in the first reference line segment set.

Angles $\varepsilon_1$, $\varepsilon_2$, $\varepsilon_3$, and $\varepsilon_4$ respectively exist between the first line segment and the first reference line segments 412, 413, 414, and 415. A deformation weight may be determined based on a distance between the first line segment and the line segment in the first reference line segment set, for example, deformation weights of the first reference line segment 412 and the first reference line segment 415 are larger, and deformation weights of the first reference line segment 413, 414 are smaller. Alternatively, some target line segments may be selected from the first reference line segment set to calculate target angles, and when the deformation factor is calculated, only the target angles are considered. For example, the first reference line segment 412 and the first reference line segment 415 are selected as target line segments, and during calculation, only a target angle $\varepsilon_1$ and a target angle $\varepsilon_2$ are considered. An algorithm for determining the deformation factor may be user-defined, for example, a linear function or a nonlinear function is used. In an example embodiment, a linear function is used. For example, the deformation factor k is determined by using a formula $Dsrc = d_1 \varepsilon_1 kp_1 + d_2 \varepsilon_2 kp_2 + \ldots + d_n \varepsilon_n kp_n$, where Dsrc is a length of the first line segment 411, $\varepsilon_1$ to $\varepsilon_n$ are respectively angles between the first line segment and the line segments in the first reference line segment set, n is a quantity of the line segments in the first reference line segment set, $d_1$ to $d_n$ are lengths of the line segments in the first reference line segment set, and $p_1$ to $p_n$ are deformation weights, and specific values may be user-defined.

In Step S233, obtain a second center of gravity of a pattern formed based on the current reference points, where a connection line between the target base point and the second center of gravity forms a second line segment, and connection lines between the second center of gravity and different current reference points form a second reference line segment set; and determine an angle between the second line segment and each line segment in the second reference line segment set based on the angular relationship.

Figure 10:
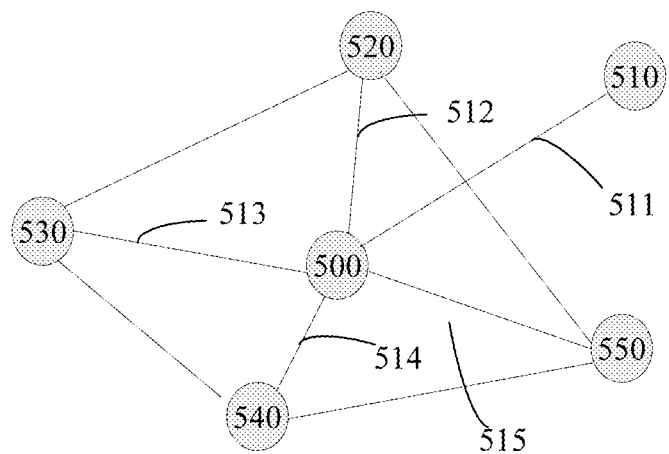
FIG. 10 is a schematic diagram of determining a location of a target base point according to an example embodiment.

Obtaining a quantity and locations of current reference points correspond to a quantity and locations of configuration reference points. For example, a second center of gravity 500 of a quadrangle formed by any four adjacent current reference points is obtained. As shown in FIG. 10, first, a location of a target base point is set, a connection line between a target base point 510 and the second center of gravity 500 forms a second line segment 511, connection lines between the second center of gravity 500 and different configuration reference points 520, 530, 540, and 550 form a second reference line segment set including second reference line segments 512, 513, 514, and 515, second angles $\varphi_1$, $\varphi_2$, $\varphi_3$, and $\varphi_4$ respectively exist between the second line segment 511 and the second reference line segments 512, 513, 514, and 515. If first angles that respectively exist between the first line segment and the first reference line segments are $\varepsilon_1$, $\varepsilon_2$, $\varepsilon_3$, and $\varepsilon_4$, an algorithm may be user-defined to determine the angle between the second line segment 511 and the line segment in the second reference line segment set according to a relationship between the angles that respectively exist between the first line segment and the first reference line segments. For example, any two first angles may be selected, a ratio between the two first angles is calculated, and a ratio between corresponding angles in the second angles are made to be the same as the ratio between the first angles, so that a direction of the second line segment is obtained, and specific angle values of $\varphi_1$, $\varphi_2$, $\varphi_3$, and $\varphi_4$ are determined.

In Step S234, determine a location of the target base point based on the deformation factor, the angle, and a length of the line segment in the second reference line segment set.

An algorithm may be user-defined to determine the location of the target base point, for example, a linear function or a nonlinear function is used. In an embodiment, the location of the target base point is determined according to a formula $Ddst = d_1' \varphi_1 kp_1 + d_2' \varphi_2 kp_2 + \ldots + d_n' \varphi_n kp_n$, where Ddst is a length of the second line segment 511, $\varphi_1$ to $\varphi_n$ are respectively the angles between the second line segment and the line segments in the second reference line segment set, n is a quantity of the line segments in the second reference line segment set and is the same as the quantity of the line segments in the first reference line segment set, and $p_1$ to $p_n$ are deformation weights, and specific values are the same as those used for calculating the deformation factor. After the length of the second line segment 511 is determined, because an endpoint of the line segment is determined according to a location of the second center of gravity 500, and the direction of the line segment is determined, a location of the other endpoint, that is, the target base point can be determined.

In an example embodiment, the location of the target base point is determine by using the center of gravity of the pattern formed by the configuration reference points and the center of gravity of the pattern formed by the current reference points, the lengths of the line segments, and the angular relationship, so that accuracy of calculating the location of the target base point is improved, and a deformed to-be-processed image is closer to the target image, so that a feature matching degree is higher.

Figure 11:
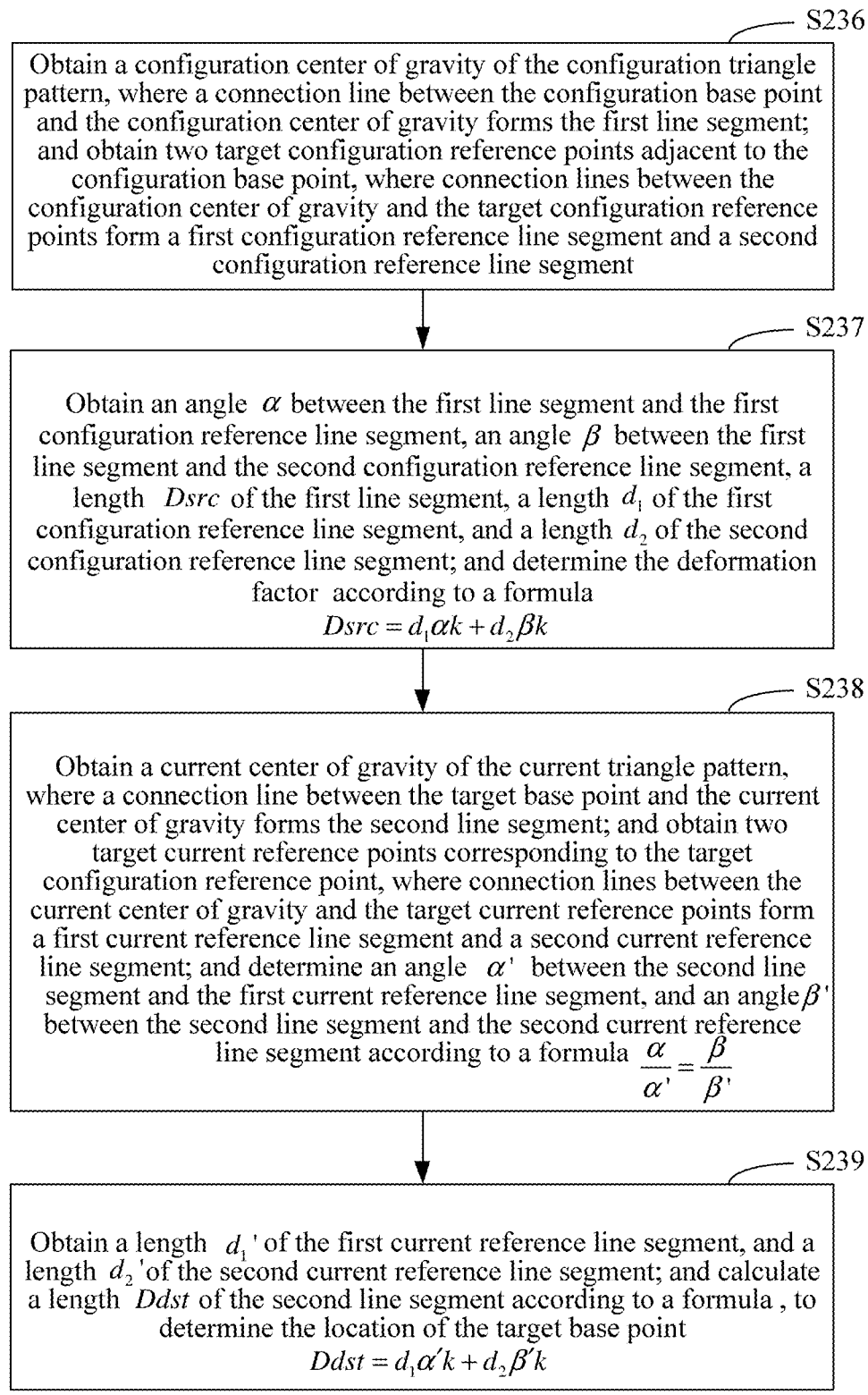
FIG. 11 is a flowchart of determining a location of a target base point according to a triangle pattern according to an example embodiment.

In an example embodiment, the pattern formed by the configuration reference points is a configuration triangle pattern formed base on three adjacent configuration reference points, and the pattern formed by the current reference points is a current triangle pattern formed according to a same rule for the configuration triangle pattern. As shown in FIG. 11, step S230 may include the following steps:

In Step S236: Obtain a configuration center of gravity of the configuration triangle pattern, where a connection line between the configuration base point and the configuration center of gravity forms the first line segment; and obtain two target configuration reference points adjacent to the configuration base point, where connection lines between the configuration center of gravity and the target configuration reference points form a first configuration reference line segment and a second configuration reference line segment.

Figure 12:
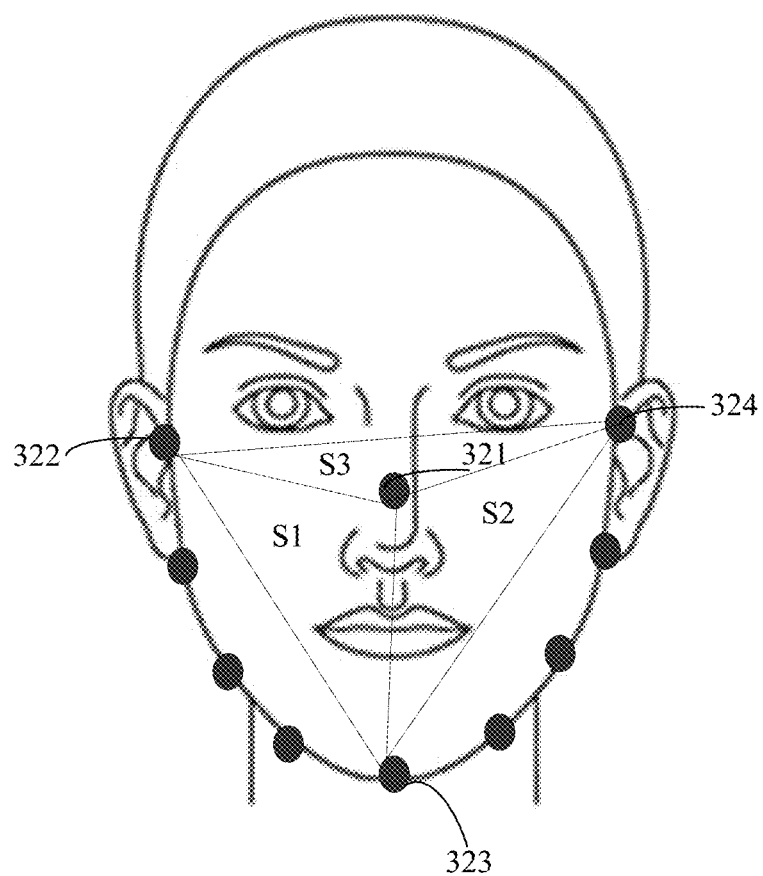
FIG. 12 is a schematic diagram of forming a configuration triangle pattern by configuration reference points according to an example embodiment.
Figure 13:
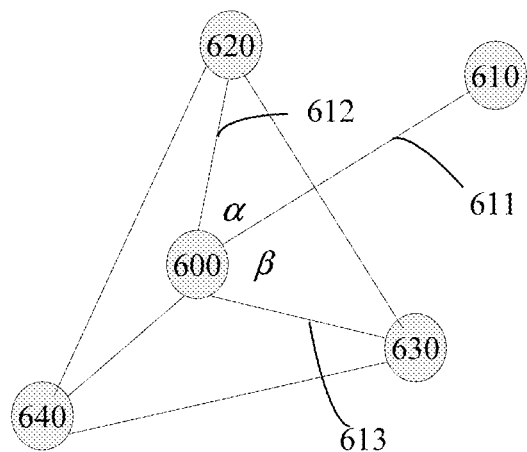
FIG. 13 is a schematic diagram of a location relationship between a configuration reference point and a configuration base point according to an example embodiment.

Specifically, when there are four configuration reference points, any three adjacent configuration reference points form three configuration triangle patterns. As shown in FIG. 12, any three adjacent configuration reference points in the configuration reference points 321, 322, 323, and 324 form configuration triangle patterns S1, S2, and S3. A configuration triangle pattern to be used may be determined according to a location of a configuration base point, to calculate the target base point. For example, a configuration triangle pattern closest to the configuration base point may be used. As shown in FIG. 13, a connection line between a configuration base point 610 and a configuration center of gravity 600 forms a first line segment 611, and connection lines between the configuration center of gravity 600 and configuration reference points 620 and 630 form a first configuration reference line segment 612 and a second configuration reference line segment 613.

Step S237: Obtain an angle α between the first line segment and the first configuration reference line segment, an angle β between the first line segment and the second configuration reference line segment, a length Dsrc of the first line segment, a length $d_1$ of the first configuration reference line segment, and a length $d_2$ of the second configuration reference line segment; and determine the deformation factor k according to a formula Dsrc=$d_1$αk+$d_2$βk.

Step S238: Obtain a current center of gravity of the current triangle pattern, where a connection line between the target base point and the current center of gravity forms the second line segment; and obtain two target current reference points corresponding to the target configuration reference point, where connection lines between the current center of gravity and the target current reference points form a first current reference line segment and a second current reference line segment; and determine an angle α' between the second line segment and the first current reference line segment, and an angle β' between the second line segment and the second current reference line segment according to a formula $$\frac{\alpha}{\alpha'} = \frac{\beta}{\beta'}.$$

Figure 14:
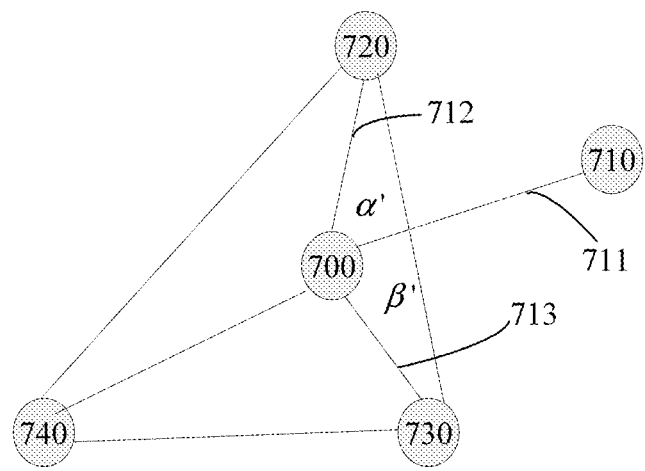
FIG. 14 is a schematic diagram of determining a location of a target base point according to an example embodiment.

Specifically, as shown in FIG. 14, first, a location of a target base point is set, a connection line between a target base point 710 and a current center of gravity 700 forms a second line segment 711, connection lines between the current center of gravity 700 and target current reference points 720 and 730 form a first current reference line segment 712 and a second current reference line segment 713, angles α' and β' respectively exist between the second line segment 711 and the first current reference line segment 712 and the second current reference line segment 713, and specific angle values of α' and β' are determined according to the formula $$\frac{\alpha}{\alpha'} = \frac{\beta}{\beta'},$$

for example, α:β=1:2, and an angle that exists between the first current reference line segment 712 and the second current reference line segment 713 is 60°, so that α' and β' are respectively 20° and 40°, to obtain a direction of the second line segment.

Step S239: Obtain a length $d_1$' of the first current reference line segment, and a length $d_2$' of the second current reference line segment; and calculate a length Ddst of the second line segment according to a formula Ddst=$d_1$'αk+$d_2$'βk, to determine the location of the target base point.

Specifically, after a length of the second line segment 711 is determined, because an endpoint of the line segment is determined according to a location of the current center of gravity 700, and the direction of the line segment is determined, a location of the other endpoint, that is, the target base point is determined.

In an example embodiment, a center of gravity of a triangle is used. Because the triangle has a small quantity of endpoints and is a stable pattern, the location of the target base point can be rapidly and conveniently calculated. During calculation, two target configuration reference points adjacent to a configuration base point may be used for calculation, so that a principle that there is large impact when locations are near is fully considered, and accuracy of calculating the location of the target base point is ensured.

Figure 15:
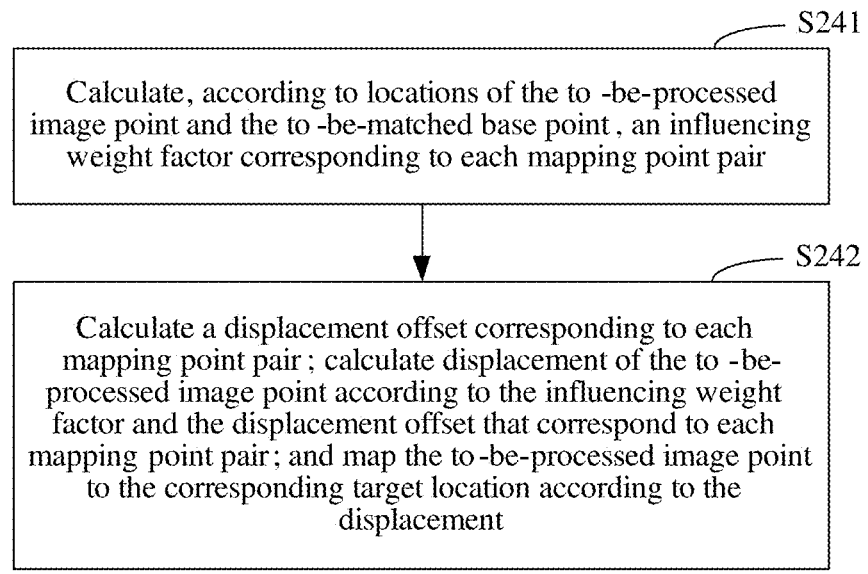
FIG. 15 is a flowchart of mapping a to-be-processed image point to a corresponding target location according to an example embodiment.

In an example embodiment, as shown in FIG. 15, step S240 may include the following steps:

Step S241: Calculate, according to locations of the to-be-processed image point and the to-be-matched base point, an influencing weight factor corresponding to each mapping point pair.

Specifically, a mapping point pair closer to a to-be-processed image point has larger impact on deformation of the to-be-processed image point. A distance between locations of the to-be-processed image point and each to-be-matched base point may be calculated according to the inversely proportional relationship, and according to the inversely proportional relationship, a smaller influencing weight factor is allocated to a longer distance, and a larger influencing weight factor is allocated to a shorter distance. A specific allocation algorithm may be user-defined as required. For example, influencing weight factors of different levels are allocated according to a total quantity of the mapping point pairs. If there are four mapping point pairs, influencing weight factors of four levels are allocated, and a sum of the influencing weight factors of the levels is 1, for example, 0.1, 0.2, 0.3, and 0.4. Next, distances between the to-be-processed image point and to-be-matched base points in the four mapping point pairs are calculated, and matching influencing weight factors are found according to the distances, and an influencing weight factor for a longest distance is the smallest, to obtain an influencing weight factor corresponding to each mapping point pair.

Step S242: Calculate a displacement offset corresponding to each mapping point pair; calculate displacement of the to-be-processed image point according to the influencing weight factor and the displacement offset that correspond to each mapping point pair; and map the to-be-processed image point to the corresponding target location according to the displacement.

Figure 16:
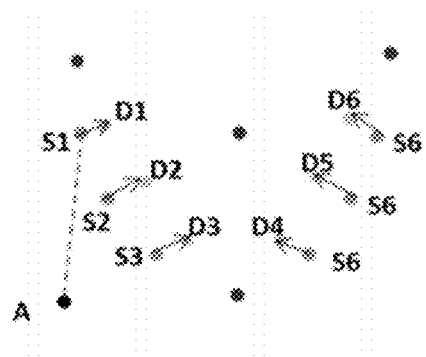
FIG. 16 is a schematic diagram of point mapping calculation according to an example embodiment.
Figure 17:
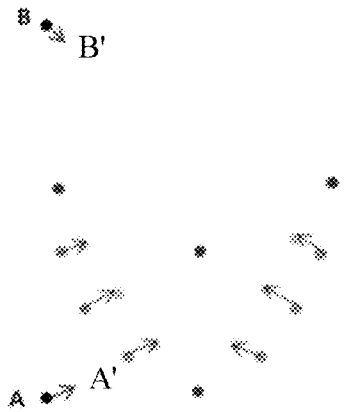
FIG. 17 is a schematic diagram of a point mapping result according to an example embodiment.

Specifically, the mapping point pairs may be indicated as $(S_1, D_1)$, $(S_2, D_2)$, . . . , and $(S_n, D_n)$, where n is the total quantity of the mapping point pairs, each point has corresponding coordinates such as $S_1(S_{1x}, S_{1y})$, and a displacement offset corresponding to the mapping point pair is $D_i-S_i$, where $D_i$ is coordinates of a target base point in an ith mapping point pair, and $S_i$ is coordinates of a to-be-matched base point in the ith mapping point pair. Because the coordinates are two-dimensional coordinates, the displacement offset may include absolute displacement and a direction. Displacement of a to-be-processed image point may be obtained according to displacement offsets corresponding to all or some mapping point pairs in the image and corresponding influencing weight factors. If the to-be-processed image is divided into areas in advance, displacement of a to-be-processed image point in each area is affected only by a mapping point pair in the same area. When a corresponding target location to which a to-be-processed image point is mapped is calculated, an influencing weight factor and a displacement offset that correspond to each mapping point pair in the same area are obtained first, and then, the target location to which the to-be-processed image point is mapped is calculated. FIG. 16 is a schematic diagram of point mapping calculation. Six mapping point pairs are included in the figure, and are respectively $(S_1, D_1), (S_2, D_2), \ldots,$ and $(S_6, D_6)$. An arrow between two points in a mapping point pair indicates a displacement offset corresponding to each mapping point pair, a direction of the arrow indicates a direction of deformation, and a length of the arrow indicates magnitude of the deformation. A dashed line between a to-be-processed image point A and a to-be-matched base point $S_1$ indicates a Euclidean distance between A and $S_1$. FIG. 17 is a schematic diagram of a point mapping result. The to-be-processed image point A is mapped to A', and a to-be-processed image point B is mapped to B'. The point A is close to a mapping point pair and therefore is greatly deformed, and the point B is far from a mapping point pair, and therefore is little deformed. The point A is closer to $(S_1, D_1), (S_2, D_2),$ and $(S_3, D_3)$ than to $(S_4, D_4), (S_5, D_5),$ and $(S_6, D_6)$, and therefore, $(S_1, D_1), (S_2, D_2), (S_3, D_3)$ have larger impact on A than $(S_4, D_4), (S_5, D_5), (S_6, D_6)$. Accordingly, a deformation direction of the point A is similar to displacement directions of $(S_1, D_1), (S_2, D_2),$ and $(S_3, D_3)$.

In an example embodiment, deformation influencing weights of different mapping point pairs for the to-be-processed image point are different. In a case of global deformation, local deformation differences may be considered, so that accuracy of a deformed image is higher.

In an embodiment, step S241 may include: calculating, based on $$w_i = \frac{1}{|A - S_i|^2} \bigg/ \sum_{j=1}^{N} \frac{1}{|A - S_j|^2},$$

an influencing weight factor $w_i$ corresponding to an ith mapping point pair, where A indicates coordinates of a location of the to-be-processed image point, $S_i$ indicates coordinates of a to-be-matched base point in the ith mapping point pair, $|A-S_i|$ indicates a distance between A and Si, j is an index, and N is a total quantity of the mapping point pairs.

Specifically, $|A-S_i|$ indicates the distance between A and Si, for example, a Euclidean distance. According to the formula, a longer distance between A and Si indicates a smaller influencing weight factor $w_i$, and a sum of the N influencing weight factors calculated according to the formula is 1.

Step S242 may include calculating a target location A' according to $$A' = A + \sum_{i=1}^{N} w_i(D_i - S_i),$$

where $D_i$ indicates coordinates of a target base point in the ith mapping point pair.

Specifically, because N is the total quantity of the mapping point pairs, a location of the to-be-processed image point A after deformation is related to all the mapping point pairs in the to-be-processed image. A local weight difference and the integrity of the image are both considered.

In an example embodiment, the influencing weight factor may be adaptively calculated according to the distance between each mapping point pair and the to-be-processed image point. This is more accurate and calculation is easy and convenient. In addition, all the mapping point pairs in the to-be-processed image affect deformation of the current to-be-processed image point, and a shorter distance to the current to-be-processed image point indicates larger impact.

Figure 18:
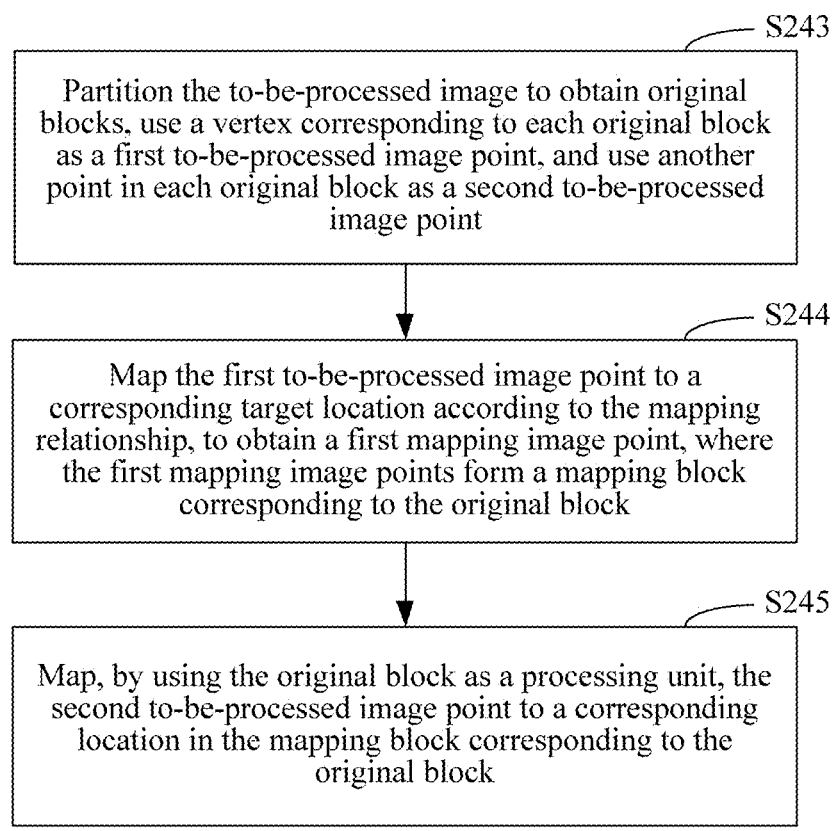
FIG. 18 is a flowchart of performing partitioning to map a to-be-processed image point to a corresponding target location according to an example embodiment.

In an example embodiment, as shown in FIG. 18, the step of mapping the to-be-processed image point to a corresponding target location according to the mapping relationship in step S240 may include the following steps:

Step S243: Partition the to-be-processed image to obtain original blocks, use a vertex corresponding to each original block as a first to-be-processed image point, and use another point in each original block as a second to-be-processed image point.

Figure 19:
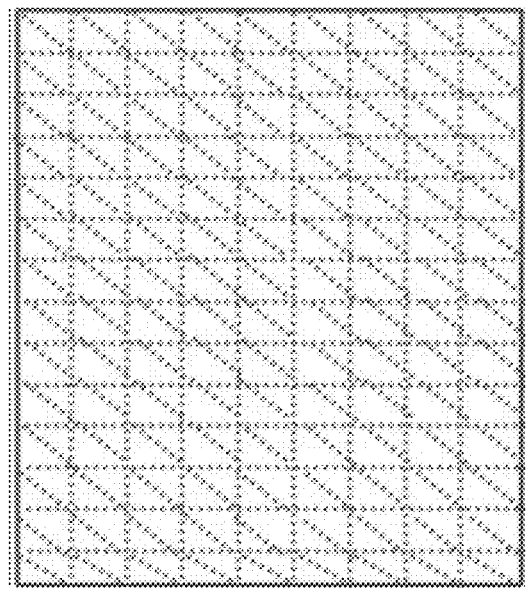
FIG. 19 is a schematic diagram of partitioning a to-be-processed image according to an example embodiment.

Specifically, a partitioning rule may be user-defined as required, for example, a triangle or a quadrangle may be obtained by means of partitioning. A quantity of blocks determines calculation complexity and precision. A larger quantity of blocks and a smaller size of each block indicate higher calculation complexity and higher precision. After the partitioning, the vertex of each original block is used as the first to-be-processed image point, and the first to-be-processed image point is a point for which a target deformation location needs to be accurately calculated during deformation. The another point in each original block is used as the second to-be-processed image point, and a location of the second to-be-processed image point after deformation is determined by a location of the first to-be-processed image point after deformation and does not need to be accurately calculated, thereby greatly reducing a quantity of points in calculation, and increasing a calculation speed. FIG. 19 is a schematic diagram of partitioning in an example embodiment. The to-be-processed image is partitioned to obtain multiple triangular original blocks.

Step S244: Map the first to-be-processed image point to a corresponding target location according to the mapping relationship, to obtain a first mapping image point, where the first mapping image points form a mapping block corresponding to the original block.

Figure 20:
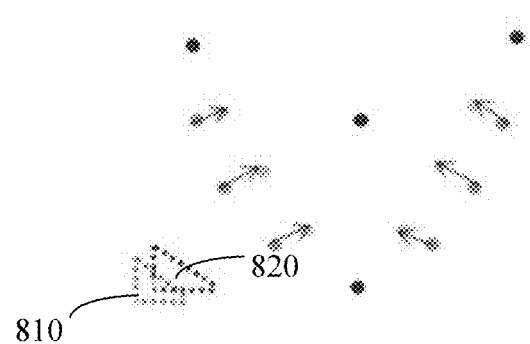
FIG. 20 is a schematic diagram of partitioning a to-be-processed image to perform mapping according to an example embodiment.

Specifically, the first to-be-processed image point is mapped to the corresponding target location according to the mapping relationship, to obtain the first mapping image point, and an offset of an entire block may be calculated according to offsets of three original vertexes of each triangle. As shown in FIG. 20, a triangular original block 810 in the to-be-processed image is offset to a location of a mapping block 820 in the image.

Step S245: Map, by using the original block as a processing unit, the second to-be-processed image point to a corresponding location in the mapping block corresponding to the original block.

Figure 21:
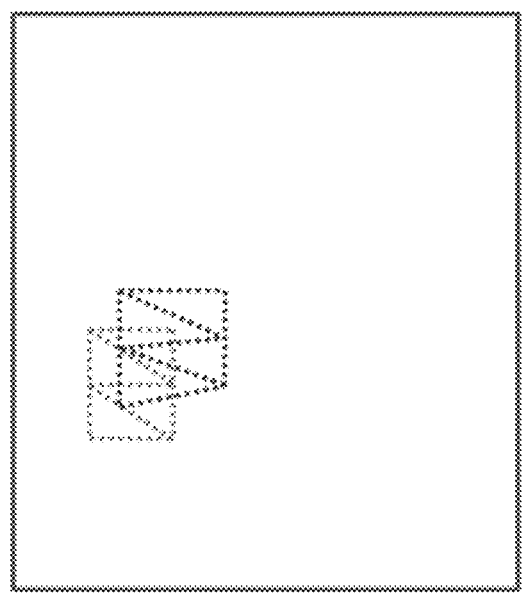
FIG. 21 is a schematic diagram of a deformed image according to an example embodiment.

Specifically, a second to-be-processed image point in each triangular original block is directly mapped to a corresponding location in a corresponding mapping block. A location of each triangular original block in the deformed image may be obtained. Because vertexes of the triangular original blocks are shared, the deformed image has consecutive pixels, as shown in FIG. 21. The entire deformation process may be implemented by using an OpenGL for Embedded Systems (OpenGL ES). Coordinates of a vertex shader of an output image are adjusted, to implement an effect after the to-be-processed image is deformed. Because of a powerful computing capability of a GPU, an entire calculation process may be completed in a very short time. For an image whose resolution is 640×480, a calculation process only needs 20 ms, that is, 50 FPS on a low-end mobile terminal such as an iPod Touch 5 device, thereby achieving performance of real-time deformation.

Figure 22:
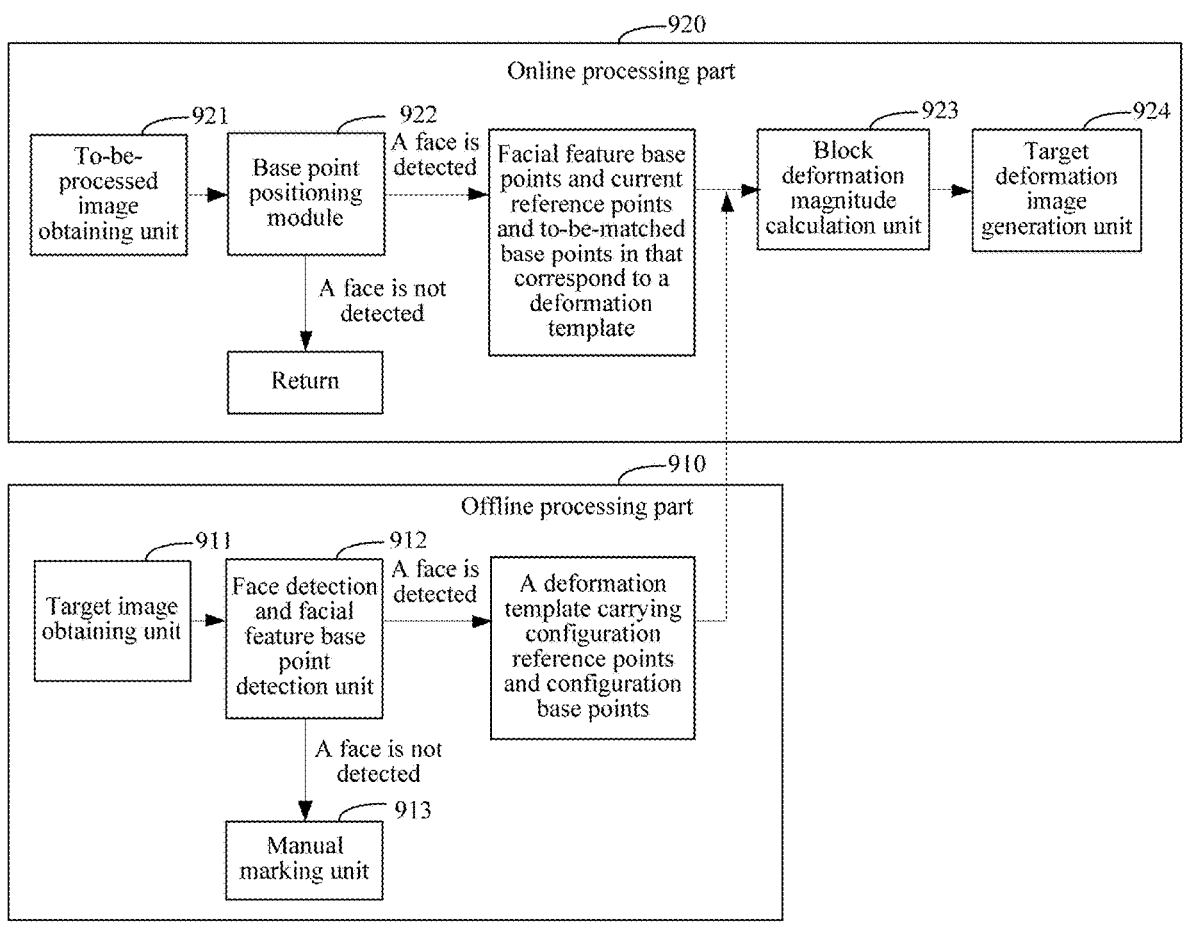
FIG. 22 is a technical framework diagram of an image deformation processing method according to an example embodiment.

In an example embodiment, the technical framework of the image deformation processing method is shown in FIG. 22, and may include an online processing part 920 and an offline processing part 910. The offline processing part 910 is configured to: generate a deformation template, and perform identification and detection to obtain configuration reference points and configuration base points in the deformation template. The offline processing part 910 may include: a target image obtaining unit 911, configured to obtain a target deformation image; a face detection and facial feature base point detection unit 912, configured to detect the target deformation image, to obtain the configuration reference points and the configuration base points; a manual marking unit 913, configured to: determine, if a face is not detected, an area of a face in a manual marking manner, and mark the configuration reference points and the configuration base points, to finally obtain the deformation template carrying the configuration reference points and the configuration base points. The online processing part 920 may include: a to-be-processed image obtaining unit 921, configured to obtain a to-be-processed input image; a base point positioning module 922, configured to: detect a face in the to-be-processed image, and position facial features to obtain facial feature base points, where the facial feature base points include current reference points and to-be-matched base points that correspond to the deformation template; a block deformation magnitude calculation unit 923, configured to calculate a block deformation magnitude by using a block as a unit according to a location relationship between the configuration reference point and the configuration base point in the deformation template, and a location relationship between the current reference point and the to-be-matched base point in the to-be-processed image; and a target deformation image generation unit 924, configured to generate a general deformed image according to deformation of each block.

Figure 23:
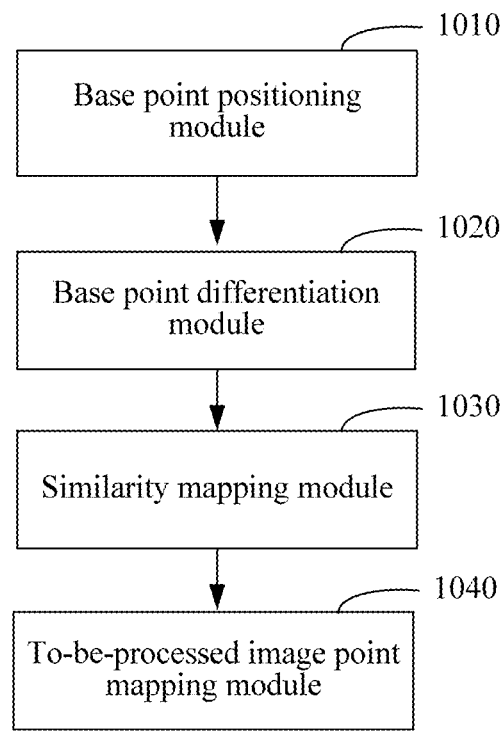
FIG. 23 is a structural block diagram of an image deformation processing apparatus according to an example embodiment.

In an example embodiment, as shown in FIG. 23, an image deformation processing apparatus is provided, including:

A base point positioning module 1010, configured to: obtain a to-be-processed image, identify a face image in the to-be-processed image, and position facial feature base points in the face image;

A base point differentiation module 1020, configured to: obtain a deformation template, the deformation template carrying configuration reference points and configuration base points; and determine, in the facial feature base points, a current reference point corresponding to the configuration reference point, and a to-be-matched base point corresponding to the configuration base point;

A similarity mapping module 1030, configured to: perform facial feature similarity mapping according to a location relationship between the configuration reference point and the configuration base point, and a location relationship between the current reference point and the to-be-matched base point; and obtain a target base point that corresponds to the configuration base point and that is in the to-be-processed image, the target base point and the corresponding to-be-matched base point forming a mapping point pair; and A to-be-processed image point mapping module 1040, configured to: determine a mapping relationship of a to-be-processed image point according to a location relationship between the target base point and the to-be-matched base point in the mapping point pair, and a location relationship between the mapping point pair and the to-be-processed image point; and map the to-be-processed image point to a corresponding target location according to the mapping relationship.

In an example embodiment, the deformation template may include configuration base points and configuration reference points that correspond to multiple types of facial features.

Figure 24:
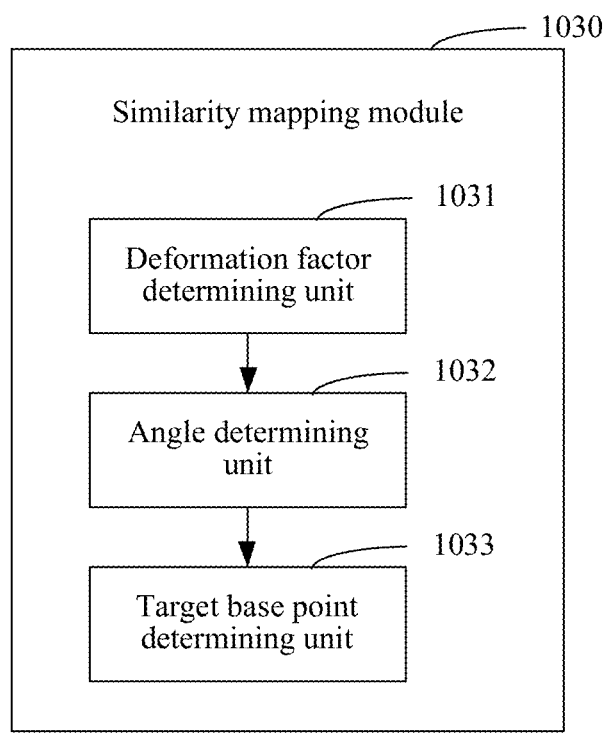
FIG. 24 is a structural block diagram of a similarity mapping module according to an example embodiment.

In an example embodiment, as shown in FIG. 24, the similarity mapping module 1030 may include:

A deformation factor determining unit 1031, configured to: obtain a first center of gravity of a pattern formed by the configuration reference points, where a connection line between the configuration base point and the first center of gravity forms a first line segment, and connection lines between the first center of gravity and different configuration reference points form a first reference line segment set; and determine a deformation factor according to an angular relationship between the first line segment and a line segment in the first reference line segment set, a length of the first line segment, and a length of the line segment in the first reference line segment set;

An angle determining unit 1032, configured to: obtain a second center of gravity of a pattern formed according to the current reference points, where a connection line between the target base point and the second center of gravity forms a second line segment, and connection lines between the second center of gravity and different current reference points form a second reference line segment set; and determine an angle between the second line segment and each line segment in the second reference line segment set according to the angular relationship; and A target base point determining unit 1033, configured to determine a location of the target base point according to the deformation factor, the angle, and a length of the line segment in the second reference line segment set.

In an example embodiment, the pattern formed by the configuration reference points is a configuration triangle pattern formed according to three adjacent configuration reference points; the pattern formed by the current reference points is a current triangle pattern formed according to a same rule for the configuration triangle pattern; and the deformation factor determining unit 1031 is further configured to: obtain a configuration center of gravity of the configuration triangle pattern, where a connection line between the configuration base point and the configuration center of gravity forms the first line segment; and obtain two target configuration reference points adjacent to the configuration base point, where connection lines between the configuration center of gravity and the target configuration reference points form a first configuration reference line segment and a second configuration reference line segment; and obtain an angle α between the first line segment and the first configuration reference line segment, an angle β between the first line segment and the second configuration reference line segment, a length Dsrc of the first line segment, a length $d_1$ of the first configuration reference line segment, and a length $d_2$ of the second configuration reference line segment; and determine the deformation factor k according to a formula $Dsrc = d_1 \alpha k + d_2 \beta k$.

The angle determining unit 1032 is further configured to: obtain a current center of gravity of the current triangle pattern, where a connection line between the target base point and the current center of gravity forms the second line segment; and obtain two target current reference points corresponding to the target configuration reference point, where connection lines between the current center of gravity and the target current reference points form a first current reference line segment and a second current reference line segment; and determine an angle α' between the second line segment and the first current reference line segment, and an angle β' between the second line segment and the second current reference line segment according to a formula $$\frac{\alpha}{\alpha'} = \frac{\beta}{\beta'}.$$

The target base point determining unit 1033 is further configured to: obtain a length $d_1'$ of the first current reference line segment, and a length $d_2'$ of the second current reference line segment; and calculate a length $Ddst=d_1\alpha'k+d_2\beta'k$ of the second line segment according to a formula Ddst, to determine the location of the target base point.

Figure 25:
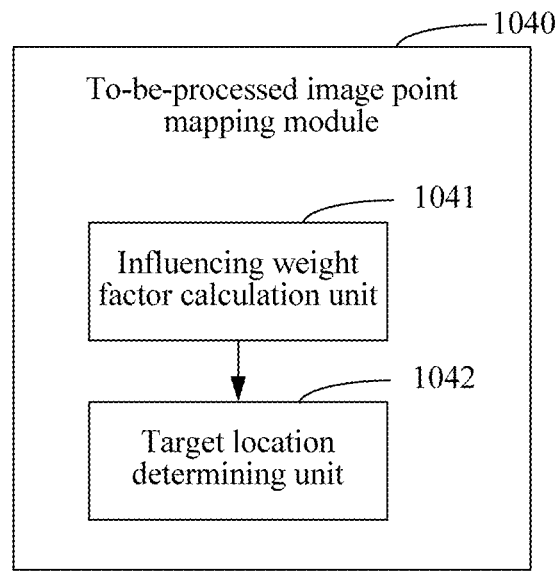
FIG. 25 is a structural block diagram of a to-be-processed image point mapping module according to an example embodiment.

In an example embodiment, as shown in FIG. 25, the to-be-processed image point mapping module 1040 may include:

An influencing weight factor calculation unit 1041, configured to calculate, according to locations of the to-be-processed image point and the to-be-matched base point, an influencing weight factor corresponding to each mapping point pair; and A target location determining unit 1042, configured to: calculate a displacement offset corresponding to each mapping point pair; calculate displacement of the to-be-processed image point according to the influencing weight factor and the displacement offset that correspond to each mapping point pair; and map the to-be-processed image point to the corresponding target location according to the displacement.

In an example embodiment, the influencing weight factor calculation unit 1041 is further configured to calculate, according to $$w_i = \frac{1}{|A - S_i|^2} / \sum_{j=1}^{N} \frac{1}{|A - S_j|^2},$$

an influencing weight factor $w_i$ corresponding to an ith mapping point pair, where A indicates coordinates of a location of the to-be-processed image point, $S_i$ indicates coordinates of a to-be-matched base point in the ith mapping point pair, $|A-S_i|$ indicates a distance between A and Si, j is an index, and N is a total quantity of the mapping point pairs.

The target location determining unit 1042 is further configured to calculate a target location $$A' = A + \sum_{i=1}^{N} w_i(D_i - S_i)$$

according to A', where $D_i$ indicates coordinates of a target base point in the ith mapping point pair.

Figure 26:
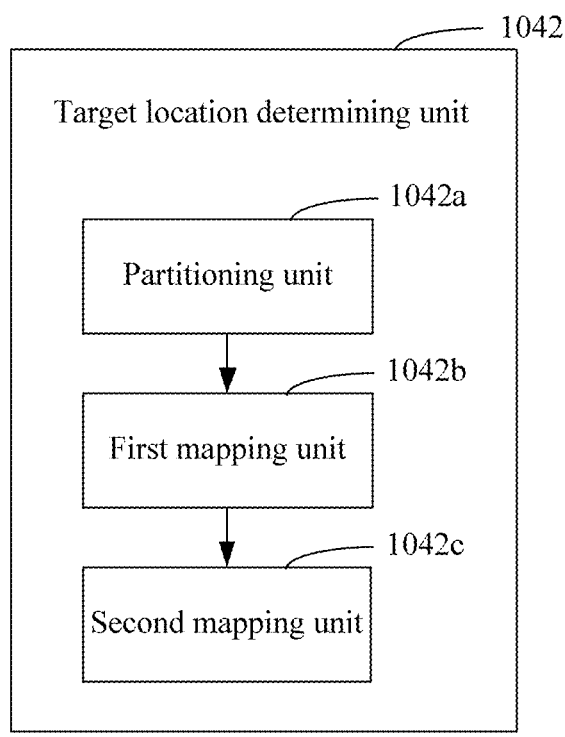
FIG. 26 is a structural block diagram of a target location determining unit according to an example embodiment.

In an example embodiment, as shown in FIG. 26, the target location determining unit 1042 may include:

A partitioning unit 1042a, configured to: partition the to-be-processed image to obtain original blocks, use a vertex corresponding to each original block as a first to-be-processed image point, and use another point in each original block as a second to-be-processed image point;

A first mapping unit 1042b, configured to map the first to-be-processed image point to a corresponding target location according to the mapping relationship, to obtain a first mapping image point, where the first mapping image points form a mapping block corresponding to the original block; and A second mapping unit 1042c, configured to map, by using the original block as a processing unit, the second to-be-processed image point to a corresponding location in the mapping block corresponding to the original block.

During actual application, functions implemented by the units in the image deformation processing apparatus may be implemented by a central processing unit (CPU), a micro processor unit (MPU), a digital signal processor (DSP), a field programmable gate array (FPGA) or the like located in the image deformation processing apparatus.

A person of ordinary skill in the art may understand that all or some of the processes in the method in the foregoing example embodiments may be implemented by the relevant hardware executing computer program code. The foregoing computer program code may be stored in a computer-readable storage medium, and a computer may execute the steps including the above example embodiments during executing. For example, in one of example embodiments, the program may be stored in a storage medium of a computer system, and is executed by at least one processor in the computer system, to implement the process including the foregoing method example embodiments. The storage medium may include a magnetic disk, an optical disc, a read-only memory (ROM), a random access memory (RAM), or the like.

Correspondingly, an example embodiment of the present invention further provides a computer storage medium, storing a computer program. The computer program is configured to perform the image deformation processing method in the example embodiments.

Various technical features in the foregoing example embodiments may be combined randomly. For ease of description, possible combinations of various technical features in the foregoing example embodiments are not all described. However, the combinations of the technical features should be considered as falling within the scope recorded in this specification provided that the combinations of the technical features are compatible with each other.

The foregoing descriptions are merely specific exemplary embodiments, but the protection scope of the present application is not limited thereto. It should be noted that, a person of ordinary skill in the art may make various changes and improvements without departing from the ideas of the present disclosure, which shall all fall within the protection scope of the present disclosure. Therefore, the protection scope of the patent of the present application is provided by the appended claims.

What is claimed is:

1. A method comprising:
    positioning facial feature base points in a face image of an obtained image;
    obtaining a deformation template, the deformation template carrying configuration reference points and configuration base points;
    determining, in the facial feature base points, a current reference point corresponding to the configuration reference point, and a to-be-matched base point corresponding to the configuration base point;
    determining that a location that corresponds to the configuration base point and that is in a to-be-processed image is a target base point, the configuration base point and the target base point forming a mapping point pair; and mapping a to-be-processed image point to a corresponding target location base on a location relationship between the target base point and the to-be-matched base point, and a location relationship between the mapping point pair and the to-be-processed image point.

2. The method according to claim 1, wherein the deformation template comprises configuration base points and configuration reference points that correspond to multiple types of facial features.

3. The method according to claim 1, wherein the step of mapping a to-be-processed image point to a corresponding target location according to a location relationship between the target base point and the to-be-matched base point, and a location relationship between the mapping point pair and the to-be-processed image point comprises:

calculating, based on locations of the to-be-processed image point and the to-be-matched base point, an influencing weight factor corresponding to each mapping point pair;

calculating a displacement offset corresponding to each mapping point pair;

calculating a displacement of the to-be-processed image point based on the influencing weight factor and the displacement offset that correspond to each mapping point pair; and mapping the to-be-processed image point to the corresponding target location based on the displacement.

4. The method according to claim 1, wherein the mapping a to-be-processed image point to a corresponding target location comprises:

partitioning the to-be-processed image to obtain original blocks, using a vertex corresponding to each original block as a first to-be-processed image point, and using another point in each original block as a second to-be-processed image point;

mapping the first to-be-processed image point to a corresponding target location based on the mapping relationship;

obtain a first mapping image point, wherein the first mapping image points form a mapping block corresponding to the original block; and mapping, by using the original block as a processing unit, the second to-be-processed image point to a corresponding location in the mapping block corresponding to the original block.

5. The method according to claim 1, wherein determining that a location that corresponds to the configuration base point in a to-be-processed image is a target base point comprises: obtaining a first center of gravity of a pattern formed by the configuration reference points, wherein a connection line between the configuration base point and the first center of gravity forms a first line segment, and connection lines between the first center of gravity and different configuration reference points form a first reference line segment set;

determining a deformation factor based on an angular relationship between the first line segment and a line segment in the first reference line segment set, a length of the first line segment, and a length of the line segment in the first reference line segment set;

obtaining a second center of gravity of a pattern formed based on the current reference points, wherein a connection line between the target base point and the second center of gravity forms a second line segment, and connection lines between the second center of gravity and different current reference points form a second reference line segment set;

determining an angle between the second line segment and each line segment in the second reference line segment set based on the angular relationship; and determining the location of the target base point based on the deformation factor, the angle, and a length of the line segment in the second reference line segment set.

6. The method according to claim 5, wherein:

the pattern formed by the configuration reference points is a configuration triangle pattern formed based on three adjacent configuration reference points; the pattern formed by the current reference points is a current triangle pattern;

performing facial feature similarity mapping based on a location relationship between the configuration reference point and the configuration base point, and a location relationship between the current reference point and the to-be-matched base point; and obtaining said target base point that corresponds to the configuration base point and that is in a to-be-processed image further comprises:

obtaining a configuration center of gravity of the configuration triangle pattern, wherein a connection line between the configuration base point and the configuration center of gravity forms the first line segment; and obtaining two target configuration reference points adjacent to the configuration base point, wherein connection lines between the configuration center of gravity and the target configuration reference points form a first configuration reference line segment and a second configuration reference line segment;

obtaining an angle α between the first line segment and the first configuration reference line segment, an angle β between the first line segment and the second configuration reference line segment, a length Dsrc of the first line segment, a length $d_1$ of the first configuration reference line segment, and a length $d_2$ of the second configuration reference line segment; and determining the deformation factor k according to a formula Dsrc=$d_1$αk+$d_2$βk;

obtaining a current center of gravity of the current triangle pattern, wherein a connection line between the target base point and the current center of gravity forms the second line segment; and obtaining two target current reference points corresponding to the target configuration reference point, wherein connection lines between the current center of gravity and the target current reference points form a first current reference line segment and a second current reference line segment;

determining an angle α' between the second line segment and the first current reference line segment, and an angle β' between the second line segment and the second current reference line segment according to a formula $$\frac{\alpha}{\alpha'} = \frac{\beta}{\beta'};$$

and obtaining a length $d_1$' of the first current reference line segment, and a length $d_2$' of the second current reference line segment; and calculating a length Ddst of the second line segment according to a formula Ddst=$d_1\alpha$'k+$d_2\beta$'k, to determine the location of the target base point.

7. The method according to claim 6, wherein the calculating, based on locations of the to-be-processed image point and the to-be-matched base point, an influencing weight factor corresponding to each mapping point pair comprises: calculating, based on $$w_i = \frac{1}{|A-S_i|^2} \bigg/ \sum_{j=1}^{N} \frac{1}{|A-S_j|^2},$$

an influencing weight factor $w_i$ corresponding to an ith mapping point pair, wherein A indicates coordinates of a location of the to-be-processed image point, $S_i$ indicates coordinates of a to-be-matched base point in the ith mapping point pair, |A−$S_i$| indicates a distance between A and Si, j is an index, and N is a total quantity of the mapping point pairs;
calculating a displacement offset corresponding to each mapping point pair;
calculating displacement of the to-be-processed image point based on the influencing weight factor and the displacement offset that correspond to each mapping point pair;
mapping the to-be-processed image point to the corresponding target location according to the displacement comprises:
calculating a target location A' base on $$A' = A + \sum_{i=1}^{N} w_i(D_i - S_i),$$

wherein $D_i$ indicates coordinates of a target base point in the ith mapping point pair.

8. An apparatus comprising:
at least one memory; and
at least one processor configured in conjunction with the at least one memory, to:
position facial feature base points in a face image in an obtained image;
obtain a deformation template, the deformation template carrying configuration reference points and configuration base points; and determine, in the facial feature base points, a current reference point corresponding to the configuration reference point, and a to-be-matched base point corresponding to the configuration base point;
determine a target base point that corresponds to the configuration base point and that is in a to-be-processed image, the target base point and the corresponding to-be-matched base point forming a mapping point pair; and
to map a to-be-processed image point to a corresponding target location based on a location relationship between the target base point and the to-be-matched base point, and a location relationship between the mapping point pair and the to-be-processed image point.

9. The apparatus according to claim 8, wherein the deformation template comprises configuration base points and configuration reference points that correspond to multiple types of facial features.

10. The apparatus according to claim 8, wherein the processor is further configured:
partition the to-be-processed image to obtain original blocks, use a vertex corresponding to each original block as a first to-be-processed image point, and use another point in each original block as a second to-be-processed image point;
map the first to-be-processed image point to a corresponding target location based on the mapping relationship, to obtain a first mapping image point, wherein the first mapping image points form a mapping block corresponding to the original block; and
map, by using the original block as a processing code, the second to-be-processed image point to a corresponding location in the mapping block corresponding to the original block.

11. The apparatus according to claim 8, wherein the processor is further configured:
obtain a first center of gravity of a pattern formed by the configuration reference points, wherein a connection line between the configuration base point and the first center of gravity forms a first line segment, and connection lines between the first center of gravity and different configuration reference points form a first reference line segment set; and determine a deformation factor based on an angular relationship between the first line segment and a line segment in the first reference line segment set, a length of the first line segment, and a length of the line segment in the first reference line segment set;
obtain a second center of gravity of the pattern formed based on the current reference points, wherein a connection line between the target base point and the second center of gravity forms a second line segment, and connection lines between the second center of gravity and different current reference points form a second reference line segment set; and
determine an angle between the second line segment and each line segment in the second reference line segment set according to the angular relationship;
determine a location of the target base point based on the deformation factor, the angle, and a length of the line segment in the second reference line segment set.

12. The apparatus according to claim 11, wherein the processor is further configured:
form a configuration triangle pattern based on three adjacent configuration reference points; the pattern formed by the current reference points is a current triangle
obtain a configuration center of gravity of the configuration triangle pattern, wherein a connection line between the configuration base point and the configuration center of gravity forms the first line segment,
obtain two target configuration reference points adjacent to the configuration base point, wherein connection lines between the configuration center of gravity and the target configuration reference points form a first configuration reference line segment and a second configuration reference line segment;
obtain an angle α between the first line segment and the first configuration reference line segment, an angle β between the first line segment and the second configuration reference line segment, a length Dsrc of the first line segment, a length $d_1$ of the first configuration reference line segment, and a length $d_2$ of the second configuration reference line segment, determine the deformation factor k according to a formula $Dsrc=d_1\alpha k+d_2\beta k$;

obtain a current center of gravity of the current triangle pattern, wherein a connection line between the target base point and the current center of gravity forms the second line segment;

obtain two target current reference points corresponding to the target configuration reference point, wherein connection lines between the current center of gravity and the target current reference points form a first current reference line segment and a second current reference line segment; and determine an angle $\alpha'$ between the second line segment and the first current reference line segment, and an angle $\beta'$ between the second line segment and the second current reference line segment according to a formula $$\frac{\alpha}{\alpha'}=\frac{\beta}{\beta'};$$

and calculate a length $Ddst=d_1\alpha'k+d_2\beta'k$ of the second line segment according to a formula Ddst, to determine the location of the target base point.

13. The apparatus according to claim 8, wherein the processor is further configured:

calculate, based on locations of the to-be-processed image point and the to-be-matched base point, an influencing weight factor corresponding to each mapping point pair; and calculate a displacement offset corresponding to each mapping point pair; calculate displacement of the to-be-processed image point based on the influencing weight factor and the displacement offset that correspond to each mapping point pair; and map the to-be-processed image point to the corresponding target location based on the displacement.

14. The apparatus according to claim 13, wherein the influencing weight factor calculation code is further configured to calculate, according to $$w_i = \frac{1}{|A-S_i|^2} \bigg/ \sum_{j=1}^{N} \frac{1}{|A-S_j|^2},$$

an influencing weight factor $w_i$ corresponding to an ith mapping point pair, wherein A indicates coordinates of a location of the to-be-processed image point, $S_i$ indicates coordinates of a to-be-matched base point in the ith mapping point pair, $|A-S_i|$ indicates a distance between A and Si, j is an index, and N is a total quantity of the mapping point pairs; and the target location determining code is further configured to cause the at least one processor to calculate a target location A' based on $$A' = A + \sum_{i=1}^{N} w_i(D_i - S_i),$$

wherein $D_i$ indicates coordinates of a target base point in the ith mapping point pair.

15. A non-transitory computer storage medium that stores computer program code that, when executed by a processor, causes the processor to perform:

position facial feature base points in a face image in of an obtained image;

obtain a deformation template, the deformation template carrying configuration reference points and configuration base points;

determine, in the facial feature base points, a current reference point corresponding to the configuration reference point, and a to-be-matched base point corresponding to the configuration base point;

determine that a location that corresponds to the configuration base point and that is in a to-be-processed image is a target base point, the configuration base point and the target base point forming a mapping point pair; and map a to-be-processed image point to a corresponding target location according base on to a location relationship between the target base point and the to-be-matched base point, and a location relationship between the mapping point pair and the to-be-processed image point.

16. The non-transitory computer storage medium according to claim 15, wherein the deformation template comprises configuration base points and configuration reference points that correspond to multiple types of facial features.

17. The non-transitory computer storage medium according to claim 15, further comprising code that causes the processor to:

obtain a first center of gravity of a pattern formed by the configuration reference points, wherein a connection line between the configuration base point and the first center of gravity forms a first line segment, and connection lines between the first center of gravity and different configuration reference points form a first reference line segment set;

determine a deformation factor based on an angular relationship between the first line segment and a line segment in the first reference line segment set, a length of the first line segment, and a length of the line segment in the first reference line segment set;

obtain a second center of gravity of a pattern formed based on the current reference points, wherein a connection line between the target base point and the second center of gravity forms a second line segment, and connection lines between the second center of gravity and different current reference points form a second reference line segment set;

determine an angle between the second line segment and each line segment in the second reference line segment set based on the angular relationship; and determine the location of the target base point based on the deformation factor, the angle, and a length of the line segment in the second reference line segment set.

18. The non-transitory computer storage medium according to claim 15, wherein the pattern formed by the configuration reference points is a configuration triangle pattern formed based on three adjacent configuration reference points; the pattern formed by the current reference points is a current triangle pattern;

performing facial feature similarity mapping based on a location relationship between the configuration reference point and the configuration base point, and a location relationship between the current reference point and the to-be-matched base point; and obtaining said target base point that corresponds to the configuration base point and that is in a to-be-processed image further comprises:
- obtaining a configuration center of gravity of the configuration triangle pattern, wherein a connection line between the configuration base point and the configuration center of gravity forms the first line segment; and
- obtaining two target configuration reference points adjacent to the configuration base point, wherein connection lines between the configuration center of gravity and the target configuration reference points form a first configuration reference line segment and a second configuration reference line segment;
- obtaining an angle α between the first line segment and the first configuration reference line segment, an angle β between the first line segment and the second configuration reference line segment, a length Dsrc of the first line segment, a length $d_1$ of the first configuration reference line segment, and a length $d_2$ of the second configuration reference line segment; and
- determining the deformation factor k according to a formula Dsrc=$d_1$αk+$d_2$βk;
- obtaining a current center of gravity of the current triangle pattern, wherein a connection line between the target base point and the current center of gravity forms the second line segment; and obtaining two target current reference points corresponding to the target configuration reference point, wherein connection lines between the current center of gravity and the target current reference points form a first current reference line segment and a second current reference line segment;
- determining an angle α' between the second line segment and the first current reference line segment, and an angle β' between the second line segment and the second current reference line segment according to a formula $$\frac{\alpha}{\alpha'} = \frac{\beta}{\beta'};$$

and
- obtaining a length $d_1$' of the first current reference line segment, and a length $d_2$' of the second current reference line segment; and calculating a length Ddst of the second line segment according to a formula Ddst=$d_1$α'k+$d_2$β'k, to determine the location of the target base point.

19. The non-transitory computer storage medium according to claim 15, wherein the mapping a to-be-processed image point to a corresponding target location based on a location relationship between the target base point and the to-be-matched base point, and a location relationship between the mapping point pair and the to-be-processed image point comprises:
- calculating, based on locations of the to-be-processed image point and the to-be-matched base point, an influencing weight factor corresponding to each mapping point pair;
- calculating a displacement offset corresponding to each mapping point pair;
- calculating a displacement of the to-be-processed image point based on the influencing weight factor and the displacement offset that correspond to each mapping point pair; and
- mapping the to-be-processed image point to the corresponding target location based on the displacement.

20. The non-transitory computer storage medium according to claim 15, wherein the calculating, based on locations of the to-be-processed image point and the to-be-matched base point, an influencing weight factor corresponding to each mapping point pair comprises:
calculating, based on $$w_i = \frac{1}{|A - S_i|^2} / \sum_{j=1}^{N} \frac{1}{|A - S_j|^2},$$

an influencing weight factor $w_i$ corresponding to an ith mapping point pair, wherein A indicates coordinates of a location of the to-be-processed image point, $S_i$ indicates coordinates of a to-be-matched base point in the ith mapping point pair, $|A-S_i|$ indicates a distance between A and Si, j is an index, and N is a total quantity of the mapping point pairs;
- calculating a displacement offset corresponding to each mapping point pair;
- calculating displacement of the to-be-processed image point based on the influencing weight factor and the displacement offset that correspond to each mapping point pair;
- mapping the to-be-processed image point to the corresponding target location based on the displacement comprises:
calculating a target location A' based on $$A' = A + \sum_{i=1}^{N} w_i(D_i - S_i),$$

wherein $D_i$ indicates coordinates of a target base point in the ith mapping point pair.

* * * * *